US010009541B2

(12) United States Patent
Jayaram et al.

(10) Patent No.: US 10,009,541 B2
(45) Date of Patent: *Jun. 26, 2018

(54) APPARATUS AND METHOD FOR CAPTURING IMAGES

(71) Applicant: Intel Corporation, Santa Clara, CA (US)

(72) Inventors: Sankar Jayaram, Pullman, WA (US); Brett Buchholtz, Missoula, MT (US); Charles DeChenne, Pullman, WA (US); John Harrison, Palouse, WA (US)

(73) Assignee: Intel Corporation, Santa Clara, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 14/521,371

(22) Filed: Oct. 22, 2014

(65) Prior Publication Data
US 2015/0035951 A1    Feb. 5, 2015

Related U.S. Application Data

(63) Continuation of application No. 13/071,353, filed on Mar. 24, 2011, now Pat. No. 8,896,671.
(Continued)

(51) Int. Cl.
*H04N 5/247* (2006.01)
*H04N 5/225* (2006.01)
(Continued)

(52) U.S. Cl.
CPC ....... *H04N 5/23238* (2013.01); *H04N 5/2253* (2013.01); *H04N 5/2254* (2013.01);
(Continued)

(58) Field of Classification Search
CPC ........... H04N 13/0239; H04N 13/0242; H04N 5/2253; H04N 5/2254; H04N 5/2259; H04N 5/23238; H04N 5/247
See application file for complete search history.

(56) References Cited

U.S. PATENT DOCUMENTS 3,269,291 A    8/1966   Bernier
4,418,993 A    12/1983  Lipton
(Continued)

FOREIGN PATENT DOCUMENTS

EP       1887790 A1      2/2008
KR     20030091886 A    12/2003
WO     2005048586 A1     5/2005

OTHER PUBLICATIONS

Beliveau Y J., et al., "Reversed Engineering of a Product Model (RPM)," SPIE, Close-Range Photogrammetry Meets Machine Vision, 1990, vol. 1395, pp. 894-899.
(Continued)

*Primary Examiner* — Md Haque
(74) *Attorney, Agent, or Firm* — Nicholson De Vos Webster & Elliott LLP

(57) ABSTRACT

An apparatus is provided for capturing images including a base, and image capture adjustment mechanism, a first camera, and a second camera. The base is constructed and arranged to support an alignable array of cameras. The image capture adjustment mechanism is disposed relative to the base for adjusting an image capture line of sight for a camera relative to the base. The first camera is carried by the base, operably coupled with the image capture adjustment mechanism, and has an image capture device. The first camera has a line of sight defining a first field of view adjustable with the image capture adjustment mechanism relative to the base. The second camera is carried by the base and has an image capture device. The second camera has a line of sight defining a second field of view extending beyond a range of the field of view for the first camera in order to produce a field of view that is greater than the field of view provided by the first camera. A method is also provided.

18 Claims, 28 Drawing Sheets

Related U.S. Application Data

(60) Provisional application No. 61/322,714, filed on Apr. 9, 2010.

(51) Int. Cl.
*H04N 5/232* (2006.01)
*H04N 13/02* (2006.01)

(52) U.S. Cl.
CPC .......... *H04N 5/2259* (2013.01); *H04N 5/247* (2013.01); *H04N 13/0239* (2013.01); *H04N 13/0242* (2013.01)

(56) References Cited

U.S. PATENT DOCUMENTS

| | | |
|---|---|---|
| 5,267,089 A | 11/1993 | Yamamoto et al. |
| 5,422,653 A | 6/1995 | Maguire, Jr. |
| 5,614,941 A | 3/1997 | Hines |
| 5,694,257 A | 12/1997 | Arnone et al. |
| 5,694,533 A | 12/1997 | Richards et al. |
| 5,745,126 A | 4/1998 | Jain et al. |
| 5,850,352 A | 12/1998 | Moezzi et al. |
| 6,084,979 A | 7/2000 | Kanade et al. |
| 6,088,527 A | 7/2000 | Rybczynski |
| 6,348,918 B1 | 2/2002 | Szeliski et al. |
| 6,535,242 B1 | 3/2003 | Strumolo et al. |
| 6,590,723 B1 | 7/2003 | Hodge |
| 6,690,338 B1 | 2/2004 | Maguire, Jr. |
| 6,788,333 B1 | 9/2004 | Uyttendaele et al. |
| 6,864,910 B1 | 3/2005 | Ogino et al. |
| 7,126,630 B1 | 10/2006 | Lee et al. |
| 7,187,401 B2 | 3/2007 | Alhadef et al. |
| 7,463,280 B2 | 12/2008 | Steuart et al. |
| 7,710,463 B2 | 5/2010 | Foote |
| 8,035,681 B2 | 10/2011 | Toyoda et al. |
| 2001/0030682 A1 | 10/2001 | Tserkovnyuk et al. |
| 2002/0082466 A1 | 6/2002 | Han |
| 2003/0063133 A1 | 4/2003 | Foote et al. |
| 2004/0027451 A1 | 2/2004 | Baker |
| 2006/0072005 A1 | 4/2006 | Thomas-Wayne |
| 2006/0072007 A1* | 4/2006 | Gilor ........................ A42B 3/04 348/61 |
| 2006/0120714 A1 | 6/2006 | Wesselink et al. |
| 2006/0228018 A1* | 10/2006 | Abramovich ...... G01N 21/8806 382/141 |
| 2007/0014347 A1 | 1/2007 | Prechtl et al. |
| 2007/0172229 A1 | 7/2007 | Wernersson |
| 2008/0278571 A1 | 11/2008 | Mora et al. |
| 2009/0128621 A1 | 5/2009 | Passmore et al. |
| 2009/0276151 A1* | 11/2009 | Bucchieri .......... G01C 21/3644 701/423 |
| 2009/0296212 A1 | 12/2009 | Routhier |
| 2009/0309987 A1* | 12/2009 | Kimura ................. G06T 3/4038 348/218.1 |
| 2010/0157064 A1* | 6/2010 | Cheng ................ G06K 9/00771 348/169 |

OTHER PUBLICATIONS

Extended European Search Report for Application No. 11766841.8, dated Dec. 4, 2013, 16 pages.

International Preliminary Report on Patentability for Application No. PCT/US2011/031830, dated Oct. 18, 2012, 5 pages.

International Search Report for Application No. PCT/US2011/031830, dated Dec. 26, 2011, 3 pages.

Jayaram S., et al., "Monitoring the Fabrication Process for as-Built Analysis and Generation," SPIE, Close-Range Photogrammetry Meets Machine Vision, 1990, vol. 1395, pp. 357-363.

Non-Final Office Action from U.S. Appl. No. 13/071,353, dated Feb. 28, 2013, 23 pages.

Notice of Allowance from U.S. Appl. No. 13/071,353, dated Jul. 23, 2014, 11 pages.

Notice of Allowance from U.S. Appl. No. 13/071,353, dated Nov. 8, 2013, 11 pages.

Written Opinion for Application No. PCT/US2011/031830, dated Dec. 26, 2011, 3 pages.

* cited by examiner

APPARATUS AND METHOD FOR CAPTURING IMAGES

RELATED PATENT DATA

This patent resulted from a continuation of U.S. patent application Ser. No. 13/071,353, which was filed Mar. 24, 2011, and which is hereby incorporated herein by reference; which claims priority to U.S. Provisional Patent Application Ser. No. 61/322,714, which was filed Apr. 9, 2010, and which is hereby incorporated herein by reference.

TECHNICAL FIELD

The present invention pertains to systems and methods for capturing detectable phenomena, such as images, sounds, or any measurable physical phenomena. More particularly, the present invention relates to the capture of images using an array of detectors over ranges that exceed the range for a single detector, such as monoscopic detectors, as well as for stereoscopic images captured with an array of detectors over ranges that exceed the range for a single pair of stereoscopic detectors.

BACKGROUND OF THE INVENTION

Techniques are known for capturing panoramic images. One technique involves rotating a camera about a central axis while capturing overlapping images that are spliced together using software. Another technique involves capturing a series of overlapping images, then splicing together adjacent overlapping images in order to produce an image that is wider than an image captured by a single camera.

A stereoscopic pair of cameras has been used to capture a stereoscopic field of view. However, there exist problems with capturing a field of view that is greater than the field of view for a stereoscopic pair of cameras. Furthermore, if wide angle cameras are used, such as cameras with a 180 degree field of view, adjacent left and right cameras can interfere with each other.

SUMMARY OF THE INVENTION

An array of monoscopic detectors, as well as an array of stereoscopic pairs of detectors, are provided to capture information from a surrounding environment, such as monoscopic images or stereoscopic images, and audio inputs from ranges exceeding that for a single detector or stereoscopic pair of detectors. For the case of image inputs, stereoscopic pairs of cameras are provided in an array. For the case of audio inputs, pairs of separated, stereoscopic directional microphones are provided in an array with a microphone substituting for each camera.

According to one aspect, an apparatus is provided for capturing images including a base, and image capture adjustment mechanism, a first camera, and a second camera. The base is constructed and arranged to support an alignable array of cameras. The image capture adjustment mechanism is disposed relative to the base for adjusting an image capture line of sight for a camera relative to the base. The first camera is carried by the base, operably coupled with the image capture adjustment mechanism, and has an image capture device. The first camera has a line of sight defining a first field of view adjustable with the image capture adjustment mechanism relative to the base. The second camera is carried by the base and has an image capture device. The second camera has a line of sight defining a second field of view extending beyond a range of the field of view for the first camera in order to produce a field of view that is greater than the field of view provided by the first camera.

According to another aspect, an apparatus is provided for capturing digital images including a base, a first digital camera, a second digital camera, and an image capture adjustment mechanism. The base is constructed and arranged to support a plurality of cameras for physically aligning images captured by adjacent cameras relative to one another. The first digital camera is supported by the base and has an image capture device. The first camera has a line of sight defining a first field of view. The second digital camera is carried by the base and has an image capture device. The second camera has a line of sight defining a second field of view extending beyond a range of the field of view for the first camera in order to produce an adjacent field of view that extends beyond the field of view provided by the first camera. The image capture adjustment mechanism is disposed relative to the base and is operatively coupled with the first digital camera for physically adjusting an image capture line of sight for the first digital camera relative to the base and the second digital camera to align an adjacent field of view for the first digital camera relative to the second digital camera.

According to yet another aspect, a method is provided for capturing images, including: providing a first camera and a second camera carried by a base to have a line of sight defining a respective field of view, the second camera having a field of view at least in part adjacent to the field of view for the first camera, the first camera carried by the base for adjustable positioning of the field of view relative to the field of view for the second camera; axially aligning the first camera relative to the second camera to render collinear an image segment within a field of view for the first camera relative to a corresponding image segment within the field of view for the second camera; and angularly aligning the first camera relative to the second camera to render the image segment within the field of view for the first camera angularly aligned relative to the image segment in the field of view for the second camera.

According to even another aspect, a stereoscopic camera system provides an apparatus for capturing a stereoscopic field of view. The stereoscopic camera system includes a support structure, a plurality of pairs of stereoscopic cameras, a plurality of camera mounting platforms, and a plurality of articulating support structures. Each of the plurality of pairs of stereoscopic cameras includes a left camera and a right camera. Each of the plurality of camera mounting platforms supports at least one of a left camera and a right camera of a specific pair of stereoscopic cameras. Each of the plurality of articulating support structures is configured to adjustably position a respective camera mount platform relative to the base to axially and angularly align two adjacent left cameras and two adjacent right cameras within adjacent pairs of stereoscopic left and right cameras having adjacent fields of view. A left and right eye camera pair as described in this invention also includes cameras that include special lenses to collect stereoscopic left/right eye images using a single camera.

BRIEF DESCRIPTION OF THE DRAWINGS

Preferred embodiments of the disclosure are described below with reference to the following accompanying drawings.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Embodiments of the present invention disclose an apparatus and method for capturing information from a surrounding environment using an array of detectors. According to one construction, monoscopic and stereoscopic images, such as still images and video images or frames are captured using an array of cameras. According to other constructions, directional audio inputs are captured with an array of directional microphones. Further optionally, arrays of detectors can be used to capture infrared, ultrasonic, sonic, subsonic, ultraviolet, or electromagnetic events or signals.

Various embodiments described herein are described with reference to figures. However, certain embodiments may be practiced without one or more of these specific details, or in combination with other known methods and configurations. In the following description, numerous specific details are set forth, such as specific configurations and methods, etc., in order to provide a thorough understanding of the present invention. In other instances, well-known construction techniques and methods have not been described in particular detail in order to not unnecessarily obscure the present invention. Reference throughout this specification to "one embodiment" or "an embodiment" means that a particular feature, configuration, composition, or characteristic described in connection with the embodiment is included in at least one embodiment of the invention. Thus, the appearances of the phrase "in one embodiment" or "an embodiment" in various places throughout this specification are not necessarily referring to the same embodiment of the invention. Furthermore, the particular features, configurations, compositions, or characteristics may be combined in any suitable manner in one or more embodiments.

As used herein, the term "field of view" is understood to mean the angular or linear or areal or volumetric extent of the observed world that is seen or viewed by an image capture device at any given moment.

As used herein, the term "adjustable line of sight" is understood to encompass one or both of translation or rotation, including modifying the inter-camera spacing between adjacent cameras in a pair.

As used herein, the term "image capture adjustment mechanism" is understood to mean any structural mechanism capable of physically aligning or moving (angularly or linearly) the position of an image of a target object on an image capture device.

Figure 1:
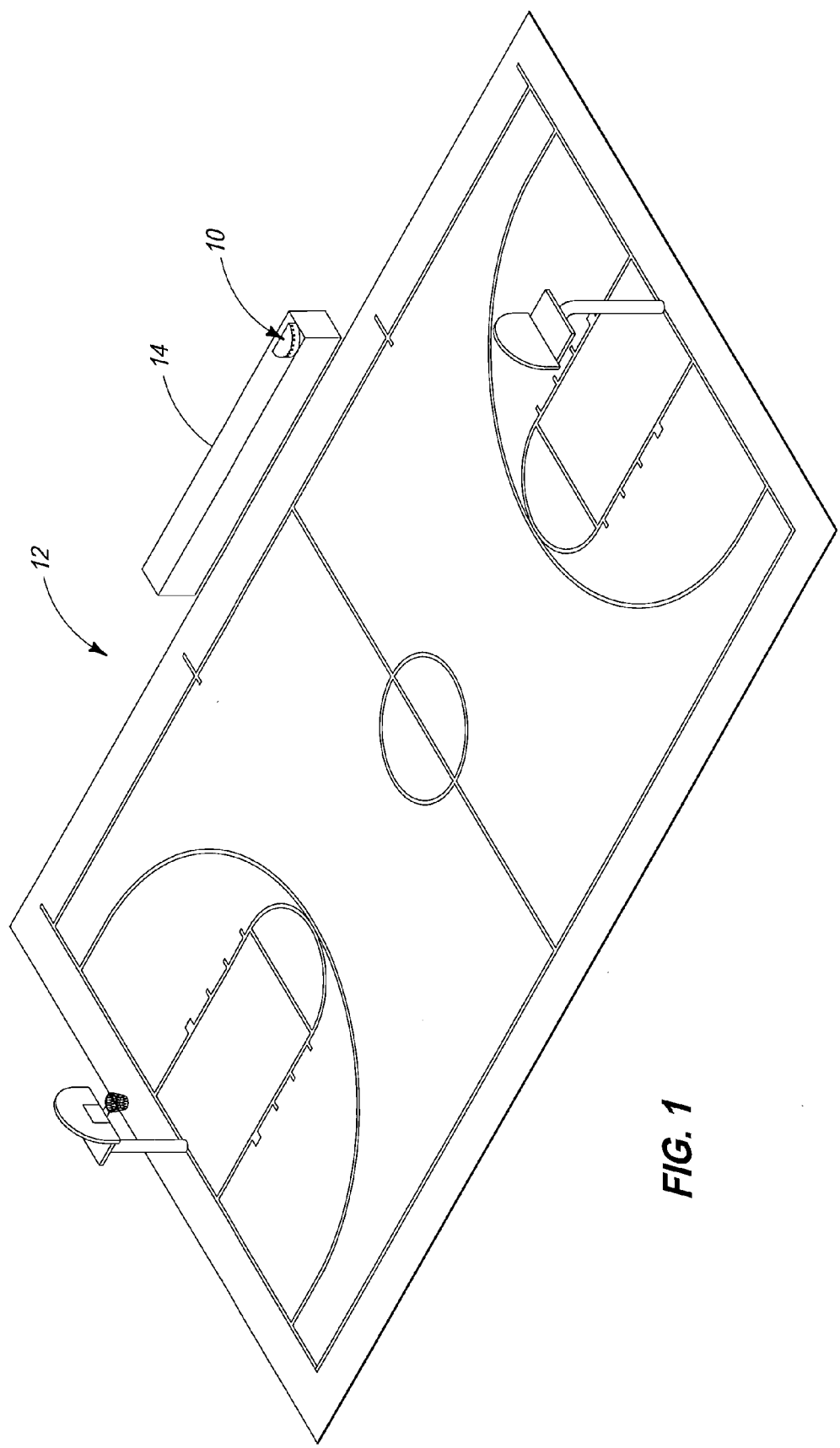
FIG. 1 is perspective view of an environment including a basketball court being captured with a 180 degree stereoscopic camera system, or apparatus, according to one embodiment.
Figure 2:
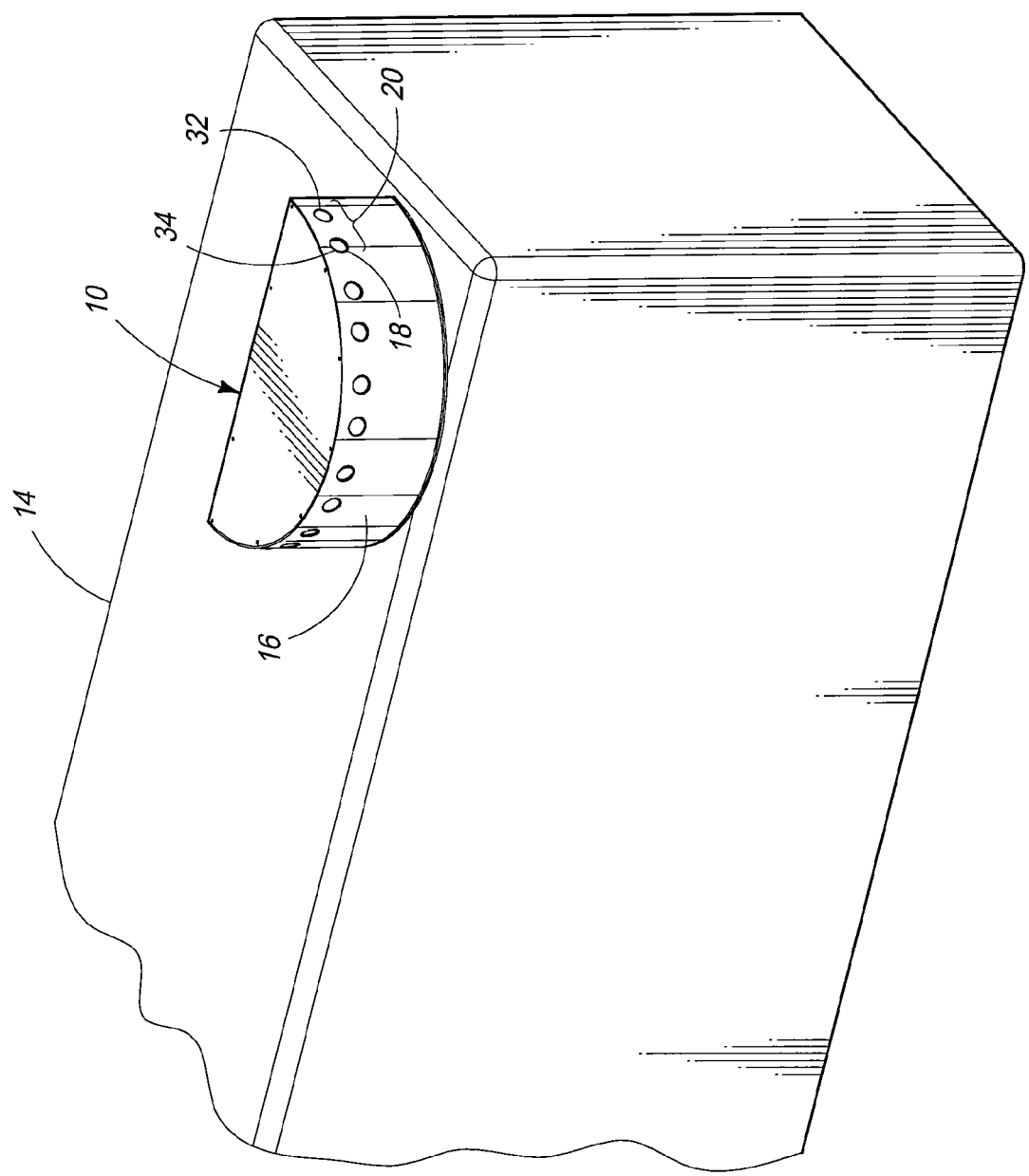
FIG. 2 is an enlarged perspective view of the stereoscopic camera system of FIG. 1 shown positioned at one end of a courtside scorer's table.
Figure 3:
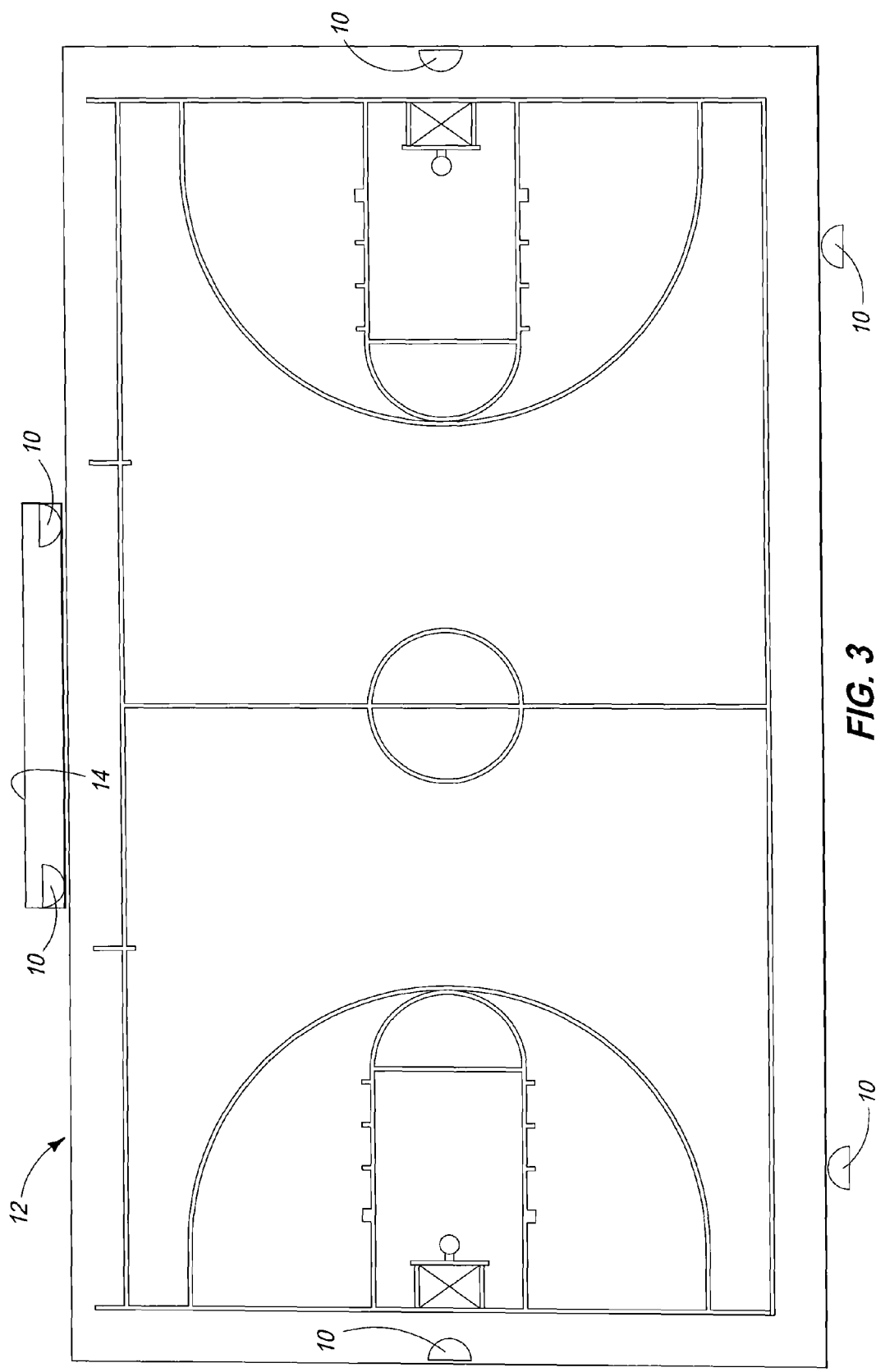
FIG. 3 is a plan view of the basketball court of FIG. 1 showing additional and/or optional placements for additional stereoscopic camera systems about the environment.
Figure 9:
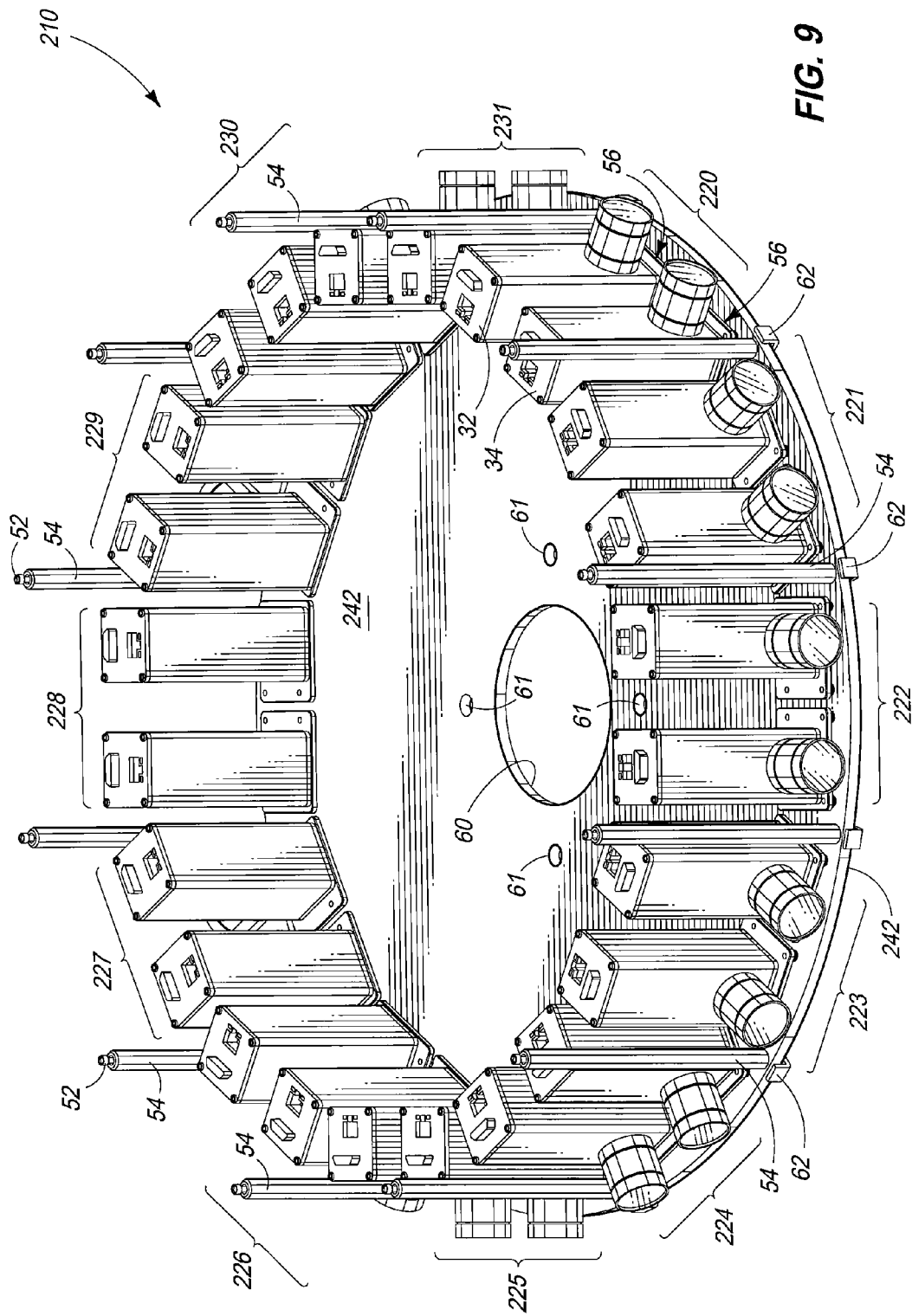
FIG. 9 is an enlarged perspective view of the stereoscopic camera system of FIG. 9 with portions removed.

FIGS. 1-3 are illustrations of an apparatus and method for capturing and aligning stereoscopic camera images from an array of multiple pairs of stereoscopic cameras provided by a stereoscopic camera system 10 within an environment 12, such as a basketball court. For purposes of disclosure, it is understood that camera system 10 of FIGS. 1-2 is essentially the same as camera system 110 of FIGS. 4, 6-7 and 10-15, except that stereoscopic camera system 10 is mounted up-side-down in the application of FIGS. 1-3 and the housing side plate 46 and back plate 48 of system 110 are extended downwardly in height by two inches sufficient to provide a support base that extends below connectors 40 so that system 10 can be supported atop a scorer's table 14, as shown in FIGS. 1 and 2. In contrast, the right-side-up configuration of system 110 depicted in FIGS. 4 and 6-7 uses a pedestal 238, post 36 and base plate 38 to support system 110 with cameras at a desired viewing height, typically corresponding with eye level height for a typical observer present within an environment under normal observation conditions. An observer can either be sitting or standing, depending on the particular environment and event being observed. Further optionally, the viewing height can be some other desirable height simulating either an elevated or a lowered condition, such as simulating an extra-tall person's view, birds-eye view or a floor-level view. Even further optionally, cameras can be placed in adjacent vertical rows to provide an elevational field of view with an angle between vertical pairs, such as in a spherical housing with cameras pointing radially outwardly in all directions. Such a vertical configuration can be implemented by stacking a plurality of horizontal base plates one atop another, with each base plate having an array of physically alignable cameras. Further optionally, an array of cameras can be mounted individually onto a vertically extending base plate (in contrast with a horizontally extending base plate as depicted in FIG. 9), or onto a baseplate having an angular configuration somewhere between horizontal and vertical.

As shown in FIG. 1-2, stereoscopic camera system 10 is supported atop scorer's table 14 by a bottom edge of housing 16 (see FIG. 2). In one case, stereoscopic camera system 10 is supported at one end of scorer's table 14, where table 14 is position at court-side, typically at center court. An array of stereoscopic pairs of video cameras, such as left video camera 32 and right video camera 34 of pair 20, are supported within housing 16 in order to capture stereoscopic video images across a range of different fields of view, for given video camera fields of view. Each video camera 34 captures images through a port, or aperture 18 in housing 16.

FIG. 3 illustrates additional locations for stereoscopic camera system 10 alongside a basketball court environment 12. In this embodiment, camera system 10 is provided in multiple locations, and stereoscopic image capture and retrieval can be provided to a viewer remote in space and/or time from each of the camera systems 10. In one case, a viewer can select from which camera system 10 they are going to view stereoscopic video images. It is understood that camera system 110 of FIGS. 4 and 6-7, as well as camera system 210 of FIGS. 5 and 8-9 can also be used at any of the locations of camera system 10 in FIG. 3. Although environment 12 is shown as a basketball court, it is understood that system 10 can be place in other environments, such as football fields, hockey rinks, museums, or any location where an individual may desire observing the real environment as a virtual environment displaced in either time or place, or both. It is also understood that cameras can generate pictures or video. In a museum application, system 10 can be moved within a museum to known locations in order to take pictures at many discrete locations in order to capture images from all angles within the museum, and a user can then visit the museum by retrieving the images at a remote location. Furthermore, the inter-camera spacing between stereoscopic pairs of cameras can be changed from a typical eye spacing for a human, say 2.5 inches, to a greater (or lesser) distance, say for a tyrannosaurus rex, thereby providing a lateral translating adjustable line of sight.

Figure 4:
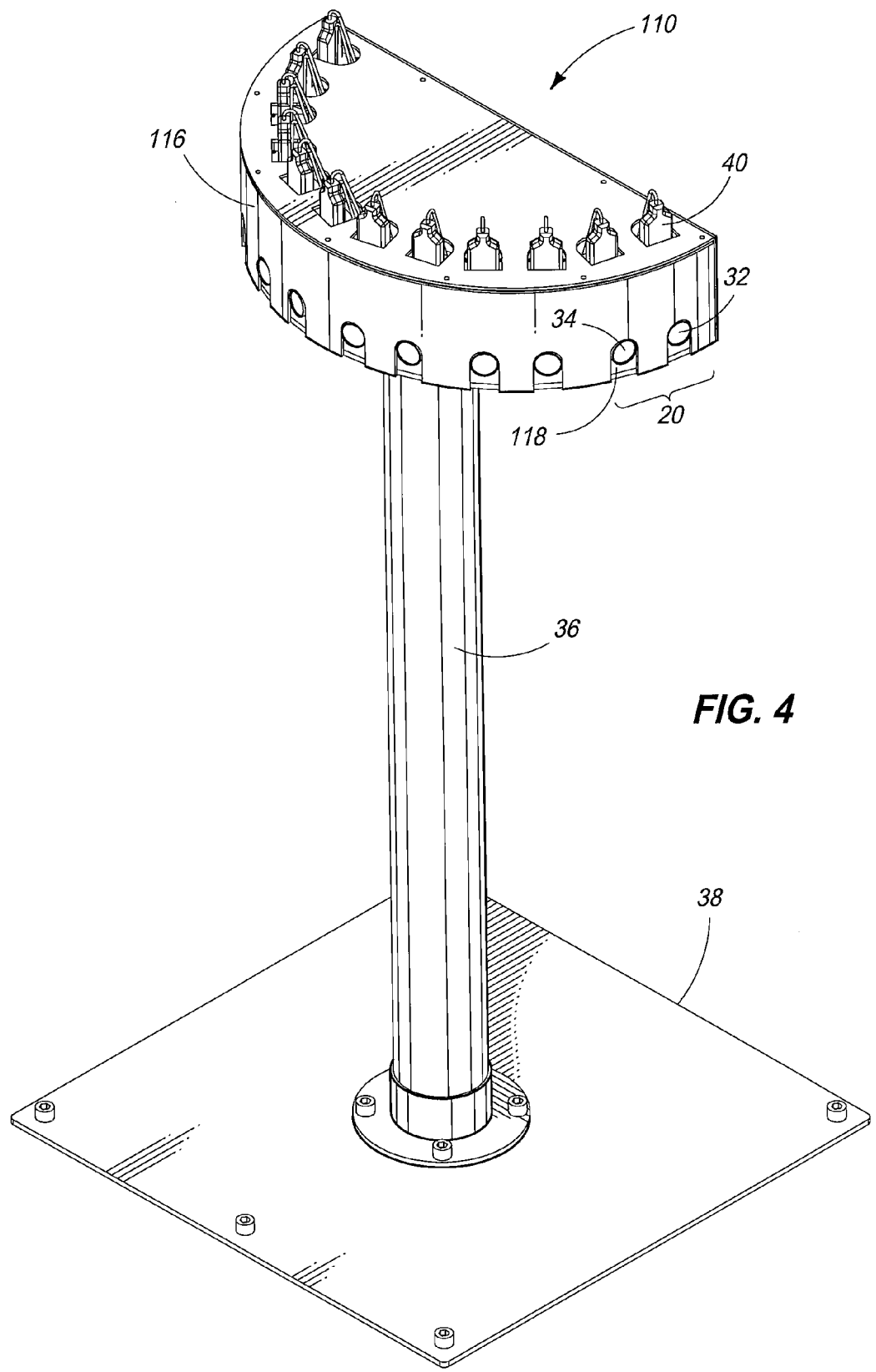
FIG. 4 is a perspective view from above of a second 180 degree stereoscopic camera system, similar to that depicted in FIGS. 1-3, but self-supported atop a post and base.
Figure 6:
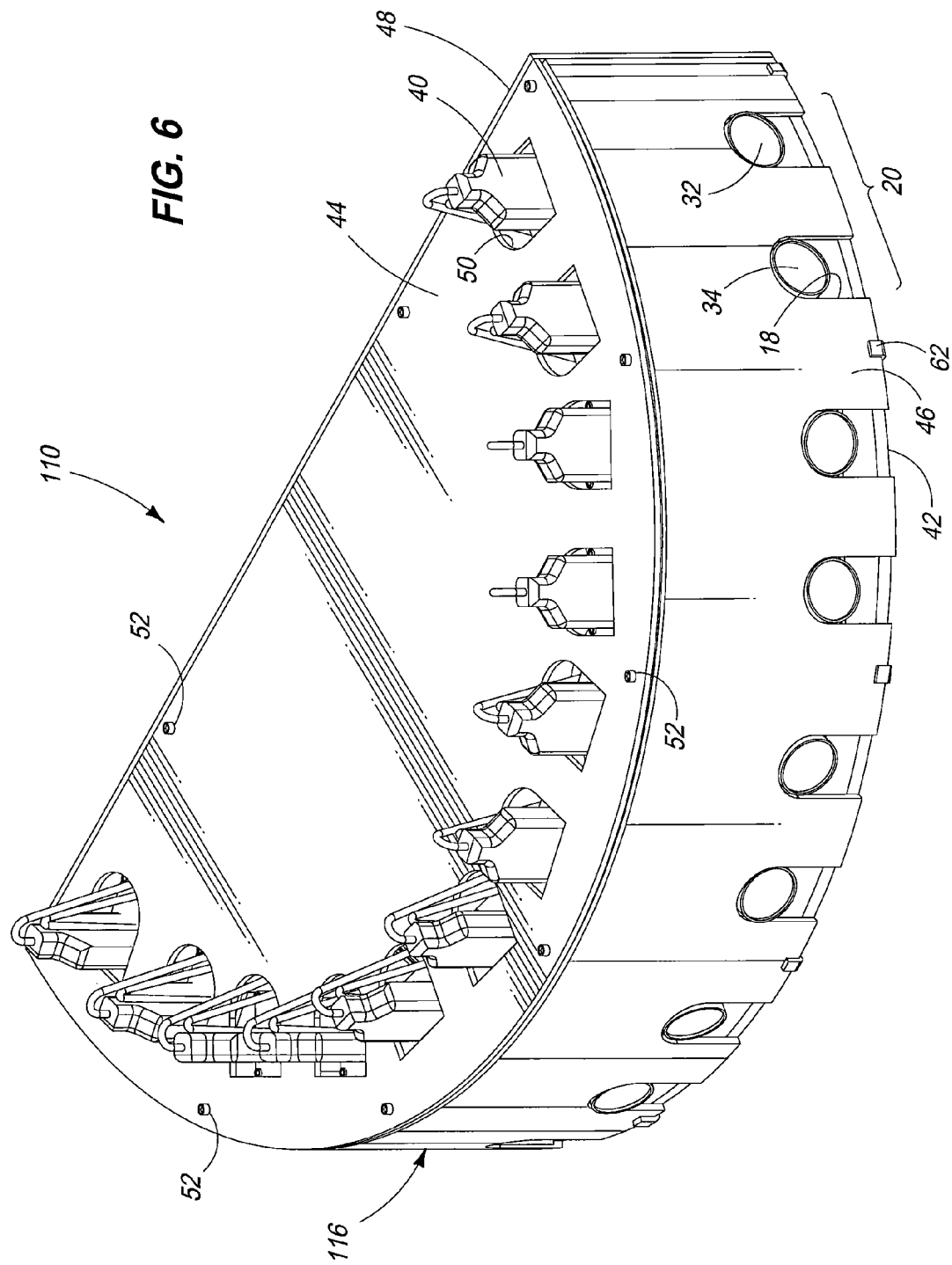
FIG. 6 is an enlarged perspective view from above of the 180 degree stereoscopic camera system of FIG. 4.
Figure 7:
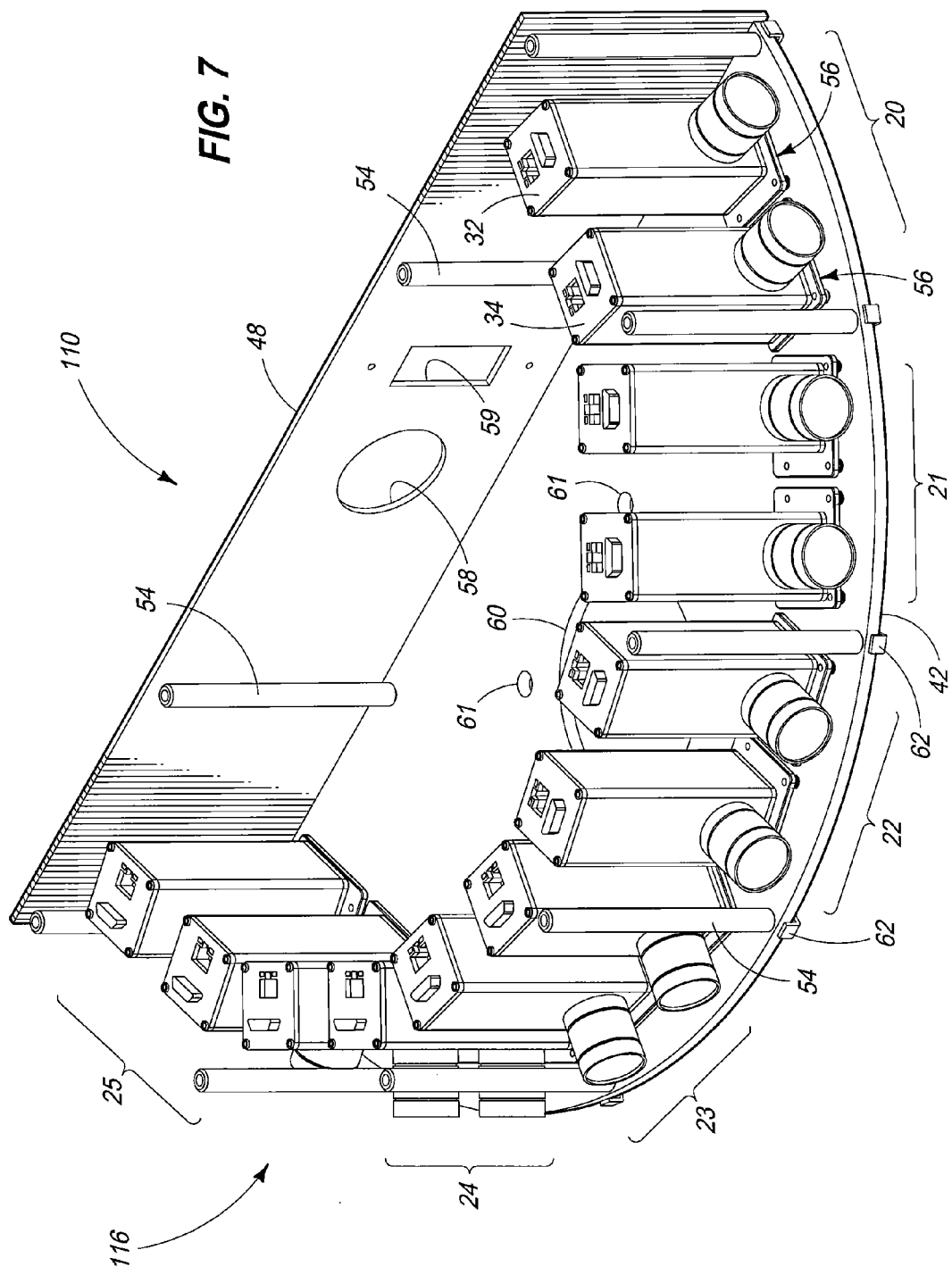
FIG. 7 is an enlarged perspective view of the stereoscopic camera system of FIG. 6 with portions removed.

FIGS. 4 and 6-7 illustrate an embodiment where cameras, such as cameras 32 and 34 of stereoscopic set 20 (see FIG. 4) are provided along a bottom edge of housing 116. In such case, electrical connectors 40 extend through a top of housing 116. Each camera 32 and 34 receives video images through a respective aperture 118. As shown in FIG. 4, camera system 110 is mounted atop a post 36 of desired height. Post 36 is mounted atop a base 38 to provide stability. Optionally, a directional microphone can be substituted for each camera.

As shown in FIG. 6, housing 116 includes a base, or support plate 42, a top plate 44, a semi-circular vertical plate 46 and a back plate 48. Each camera 32 and 34 is coupled to a data and power connector 40 that extends through an aperture 50 in top plate 44. Threaded cap-head bolts 52 couple together top plate 44, side plates 46 and 48, and bottom plate 42. An L-shaped bracket 62 with a bore is mounted between each cap screw 52 that mounts through bottom plate 42, providing a shelf for supporting a bottom edge of side plate 46.

As shown in FIG. 7, portions of housing 116 of stereoscopic camera system 110 are removed in order to observe a plurality of pairs 20-25 of stereoscopic left cameras 32 and right cameras 34. Each camera is mounted to base plate 42 with an image capture adjustment mechanism in the form of an articulating support structure, or base frame 56 that can be used to align the camera relative to the base plate 42. Optionally, a directional microphone can be mounted to each base frame, substituting for each camera 32, 34 in pairs 20-25. Optionally, an image capture device, similar to cameras 32 and 34, can be provided for capturing electromagnetic radiation in one or more of any of the spectrums, including infrared and/or optical (visible) portions of the electromagnetic spectrum. Further optionally, an image capture device can be provided for capturing ultrasonic images using an array of ultrasonic image capture devices.

Figure 18:
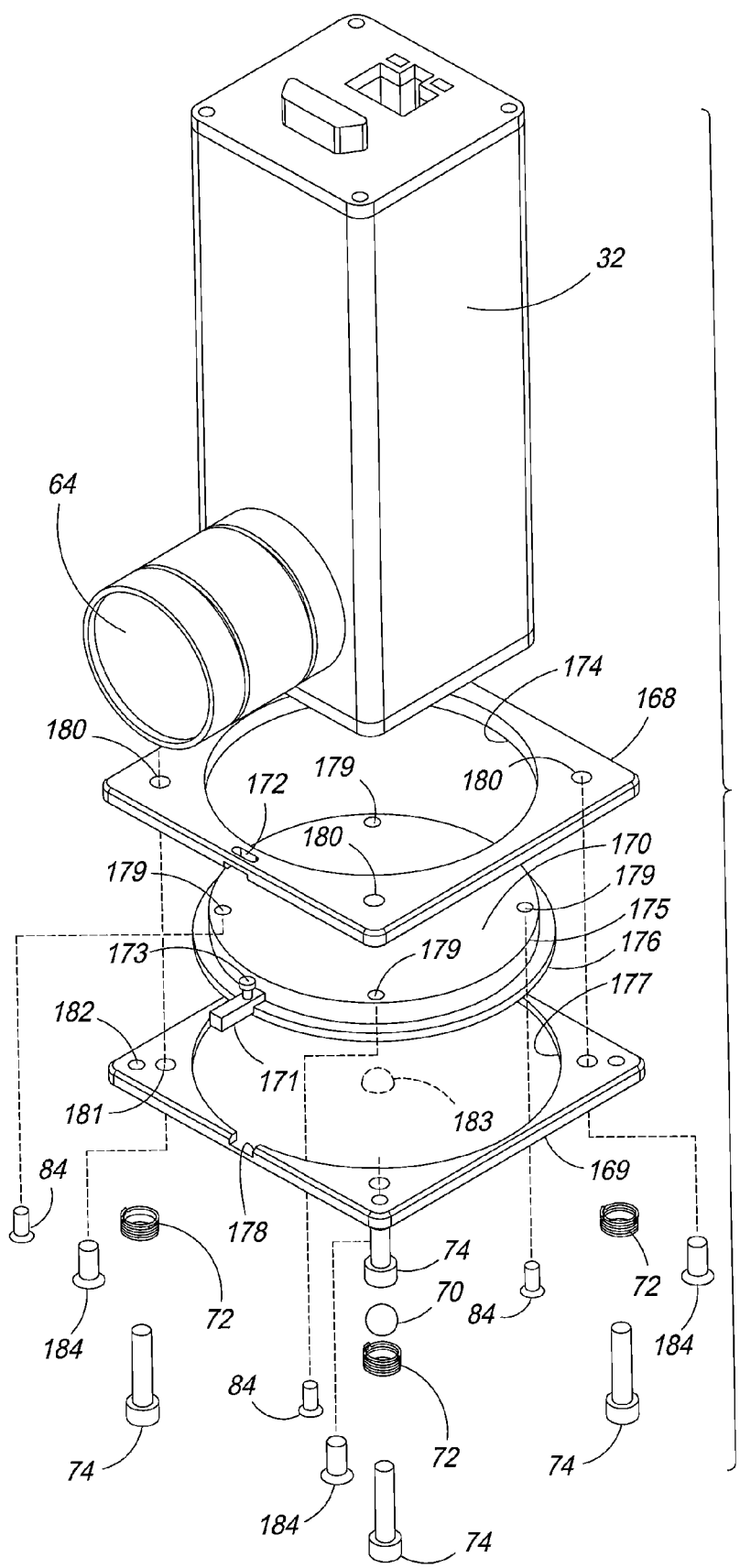
FIG. 18 is an exploded perspective view of the articulating support structure of FIG. 17.

As shown in FIG. 7, each post 54 has a threaded bore at each end sized to receive a respective threaded cap-screw, or fastener 52 (see FIG. 6). Base plate 42 and top plate 44 (see FIG. 6) each have corresponding holes that align with each post 54 to receive a fastener 52, where the enlarged head of fastener 52 secures respective plates 42 and 44 together against side plate 46 and back plate 48. Back plate 48 includes a ventilation port 58 in which a cooling fan is mounted (not shown) and a switch port in which a power switch (not shown) is mounted for turning the fan on and off. An array of four bores 61 are configured in bottom plate 42 to align with corresponding bores 242 in pedestal 238 (see FIG. 18) so each receives a bolt and nut (not shown) to secure system 116 atop pedestal 238. Pedestal 238 is then mounted atop post 36 (see FIG. 4) or atop a tripod, such as tripod 236 shown in FIG. 5 using a threaded mounting aperture 245 (see FIG. 19). When assembled together, bore 60 aligns with bore 243 of pedestal 238 (of FIG. 18) to enable communications cables and power cables for cameras 32 and 34 to exit housing 116.

Optionally, the construction of camera system 110 of FIG. 7 (or optional configurations depicted in FIGS. 5 and 8-9) can be constructed to have a monoscopic array of detectors, such as video cameras. Such a construction would generate aligned 180 degree or 360 degree monoscopic output, or video, where the field of view of adjacent cameras can be physically aligned using individual base plates and image capture adjustment mechanisms and methods. As a further option, each left camera can be turned off and the output from each right camera can be captured in order to achieve panoramic 180 degree or 360 degree video imaging (or each right camera can be turned off). According to this optional implementation, the resulting array of cameras would not be arranged concentrically about a point. For the case where only a monoscopic array of adjustable cameras are provided on base plates, the cameras can be arranged concentrically about a point, or they can be arranged so that they are not concentric.

According to a further optional construction, an array of monoscopic cameras can be provided, each on an adjustable base plate with an image capture adjustment mechanism. A mirrored adapter can be mounted onto each monoscopic camera lens in order to generate alternating left and right offset stereoscopic video images. Such a mirrored stereoscopic 3D camera adapter is provided by a NuView SX2000 video lens adapter sold by Mindlfux, Jasandre Pty. Ltd., P.O. Box 494, Roseville, NSW 2069 Australia, which generates 3-D field sequential video, under a patent pending process entitled STEREO-OPTIX!.

Figure 5:
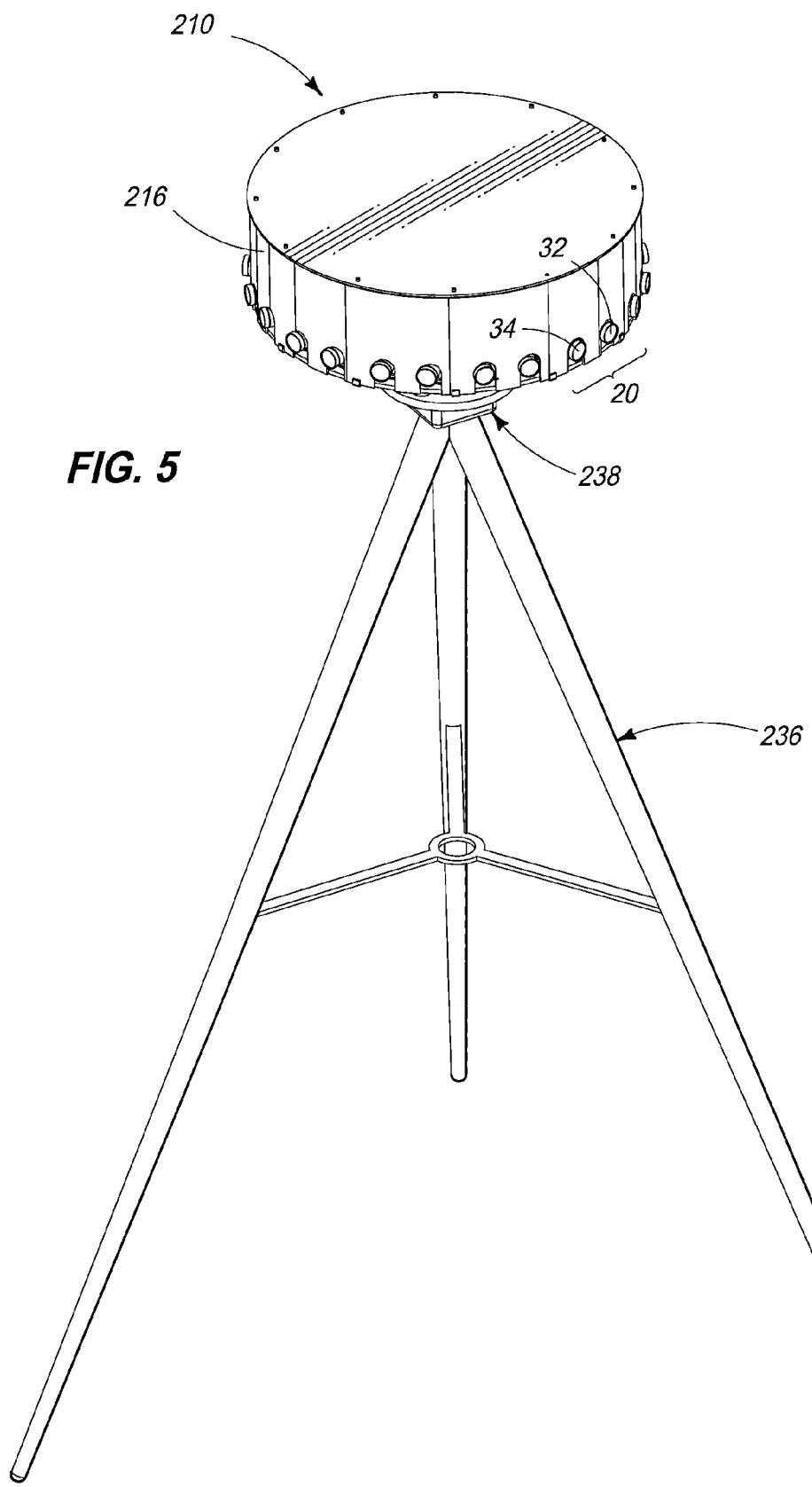
FIG. 5 is a perspective view from above of a third stereoscopic camera system, similar to that depicted in FIG. 4, but with a 360 degree stereoscopic camera array self-supported atop a tripod.
Figure 8:
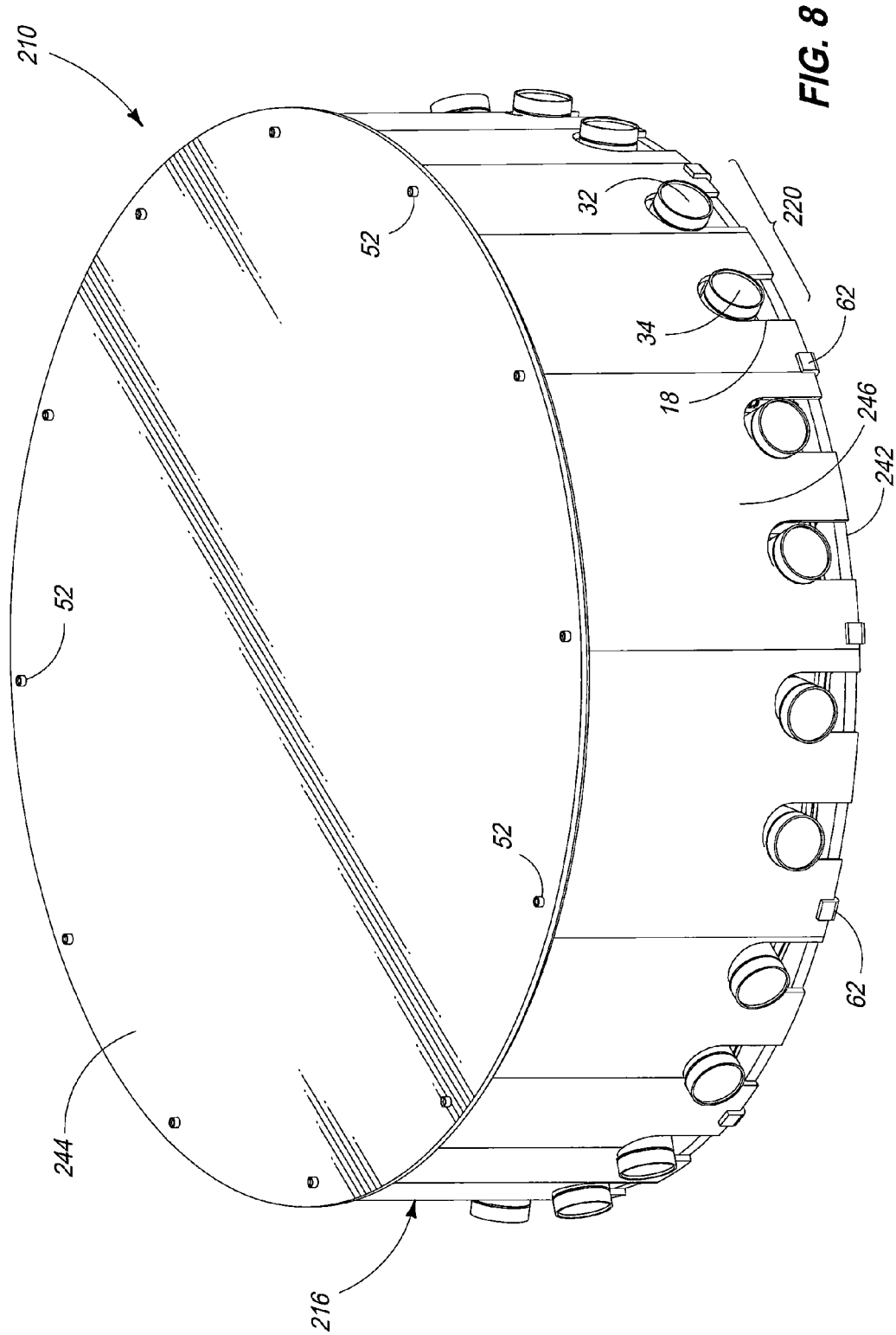
FIG. 8 is an enlarged perspective view from above of the 360 degree stereoscopic camera system of FIG. 5.

FIGS. 5 and 8-9 illustrate another embodiment for a stereoscopic camera system 210 having a full 360 degree array of pairs 20 of stereoscopic left and right cameras 32 and 34 supported within housing 216. Housing 216 mounts via pedestal 238 atop a tripod, or support structure 236, as shown in FIG. 5. As shown in FIG. 8, threaded cap screws 52 affix together a top plate 244, a side plate 246, and a bottom plate 242 for housing 216 of camera system 210. Left and right video cameras 32 and 34 form a stereoscopic pair 220, with a lens from each camera extending through a respective aperture 18 in side plate 246. An L-shaped bracket 62 with a bore is mounted between each cap screw 52 that mounts through bottom plate 242, providing a shelf for supporting a bottom edge of side plate 246.

As shown in FIG. 9, stereoscopic camera system 210 includes a complete circumferential array of stereoscopic pairs 220-231 of left cameras 32 and right cameras 34 used to capture dynamic (or static) landscape images within an environment surrounding system 210. A circumferential array of posts 54, threaded cap screws 52 and L-brackets 62 are used to hold together housing 216 (of FIG. 9), in a manner similar to that shown for system 110 in FIG. 7. Each camera 32, 34 is mounted in an adjustable manner onto base plate 242 via an adjustable, articulating support structure 56.

Bores 61 and port 60 facilitate mounting of system 210 onto pedestal 238 (of FIG. 18) in a manner similar to that shown for system 110 (of FIG. 7).

Figure 10:
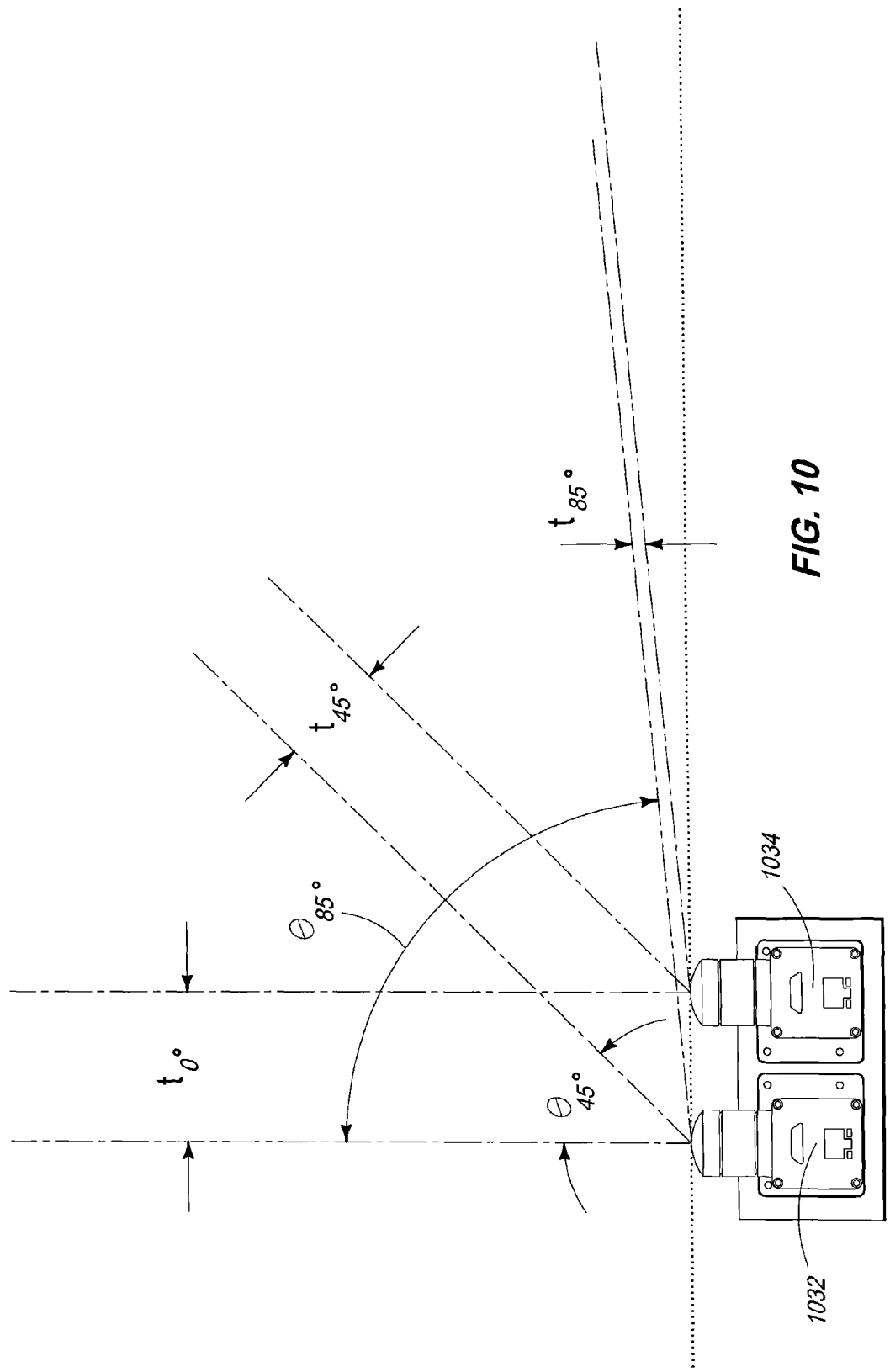
FIG. 10 is a simplified plan view from above of a pair of 180 degree fisheye cameras configured to capture stereoscopic images and illustrating interference and camera spacing complexities.

FIG. 10 is a simplified plan view from above of a pair of 180 degree left and right fisheye cameras 1032 and 1034 configured to capture stereoscopic images. As shown in FIG. 10, an interspace distance, t, between left camera 1032 and right camera 1034 is shown. For the case where images are captured directly in front on cameras 1032 and 1034, interspace distance, $t_{0°}$, provides a maximum lateral spacing between cameras 1032 and 1034. However, such interspace distance diminishes for viewing angles θ=45° and θ=85°. As the angle, θ, increases, interspace distance, t, diminishes, which also diminishes stereoscopic perspective. Additionally, as angle, θ, increases, a lens on one of camera 1032 and 1034 interferes with another of lens on another of camera 1032 and 1034, which interferes with image capture. Accordingly, there is a limit on the angular field of view that is practical when capturing images from a wide field of view, thereby necessitating a solution provided by use of multiple cameras in stereoscopic configurations, as shown in the various embodiments depicted herein.

For the case where $t_{0°}$=2.5", a field of view for an array of six pairs of stereoscopic cameras in FIG. 7 will have a trimmed field of view for each camera of 30° (each camera has an untrimmed field of view of approximately 41°). This configuration provides a highly preferred physical alignment with minimal image distortion. For the same case where $t_{0°}$=2.5", a field of view for an array of five pairs of stereoscopic cameras (covering 180 degree range) will have a trimmed field of view for each camera of 36° (approximately 45° untrimmed). This configuration provides a preferred physical alignment with slightly greater image distortion than for a six pair array. For the same case where $t_{0°}$=2.5", a field of view for an array of four pairs of stereoscopic cameras (covering 180 degree range) will have a trimmed field of view for each camera of 45° (approximately 60° untrimmed). This configuration provides a moderately preferred physical alignment with slightly greater image distortion than for a six pair array. For the same case where $t_{0°}$=2.5", a field of view for an array of three pairs of stereoscopic cameras (covering 180 degree range) will have a trimmed field of view for each camera of 60° (approximately 75° untrimmed). This configuration provides a reasonably preferred physical alignment with slightly greater image distortion than for a six pair array. For the same case where $t_{0°}$=2.5", a field of view for an array of two pairs of stereoscopic cameras (covering 180 degree range) will have a trimmed field of view for each camera of 90° (approximately 110° untrimmed). This configuration provides a somewhat preferred physical alignment with slightly greater image distortion than for a six pair array. The difference between untrimmed field of view and trimmed field of view is the extent of overlap between adjacent cameras on either side of a specific camera, after alignment of the adjacent cameras.

Figure 11:
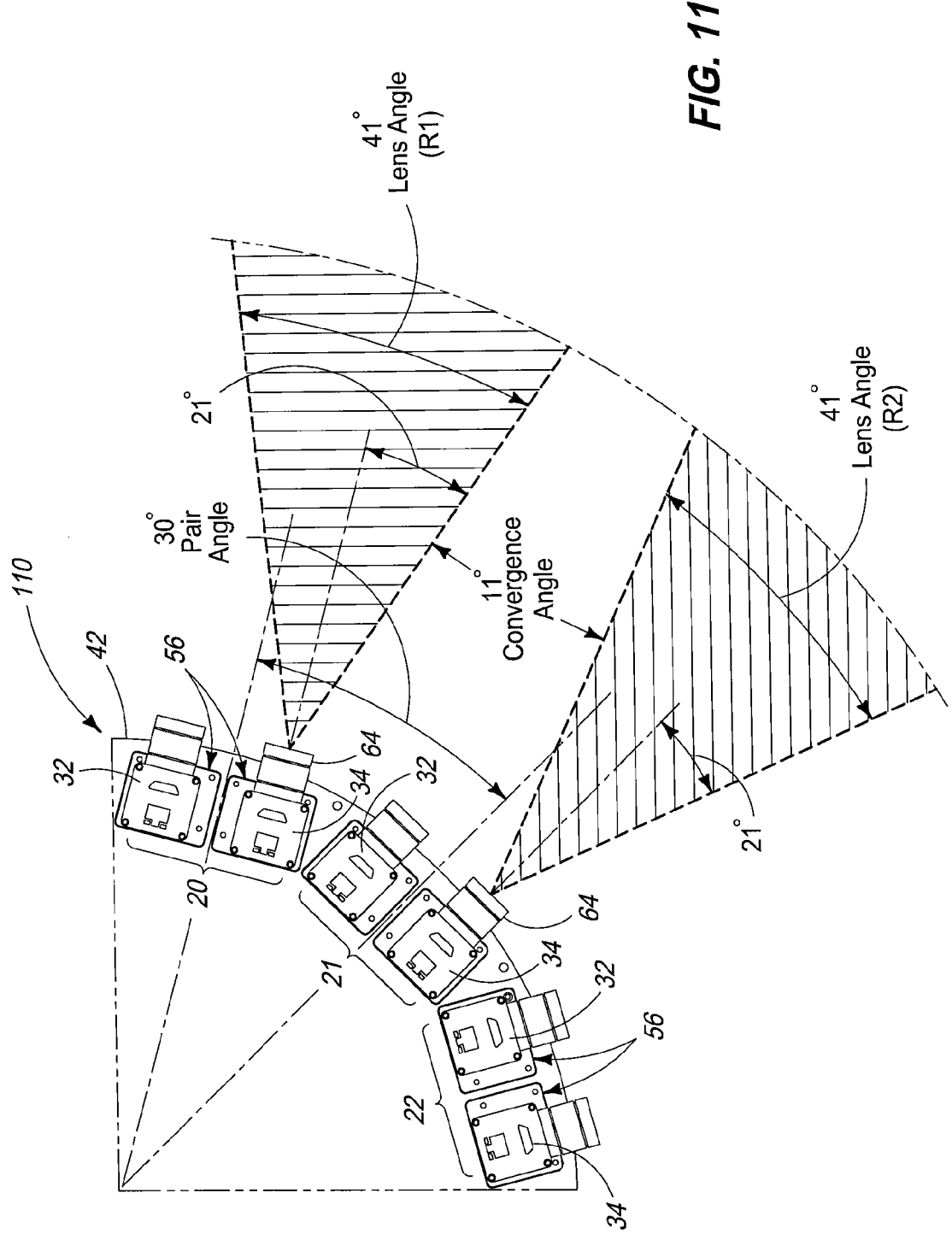
FIG. 11 is a simplified plan view from above of three adjacent sets of stereoscopic cameras from the stereoscopic camera system of FIGS. 4 and 6-7 or FIGS. 5 and 8-9, as well as the stereoscopic camera system of FIGS. 1-3, but where each camera is suspended beneath the base plate, and illustrating lens fields of view for two adjacent right cameras.
Figure 12:
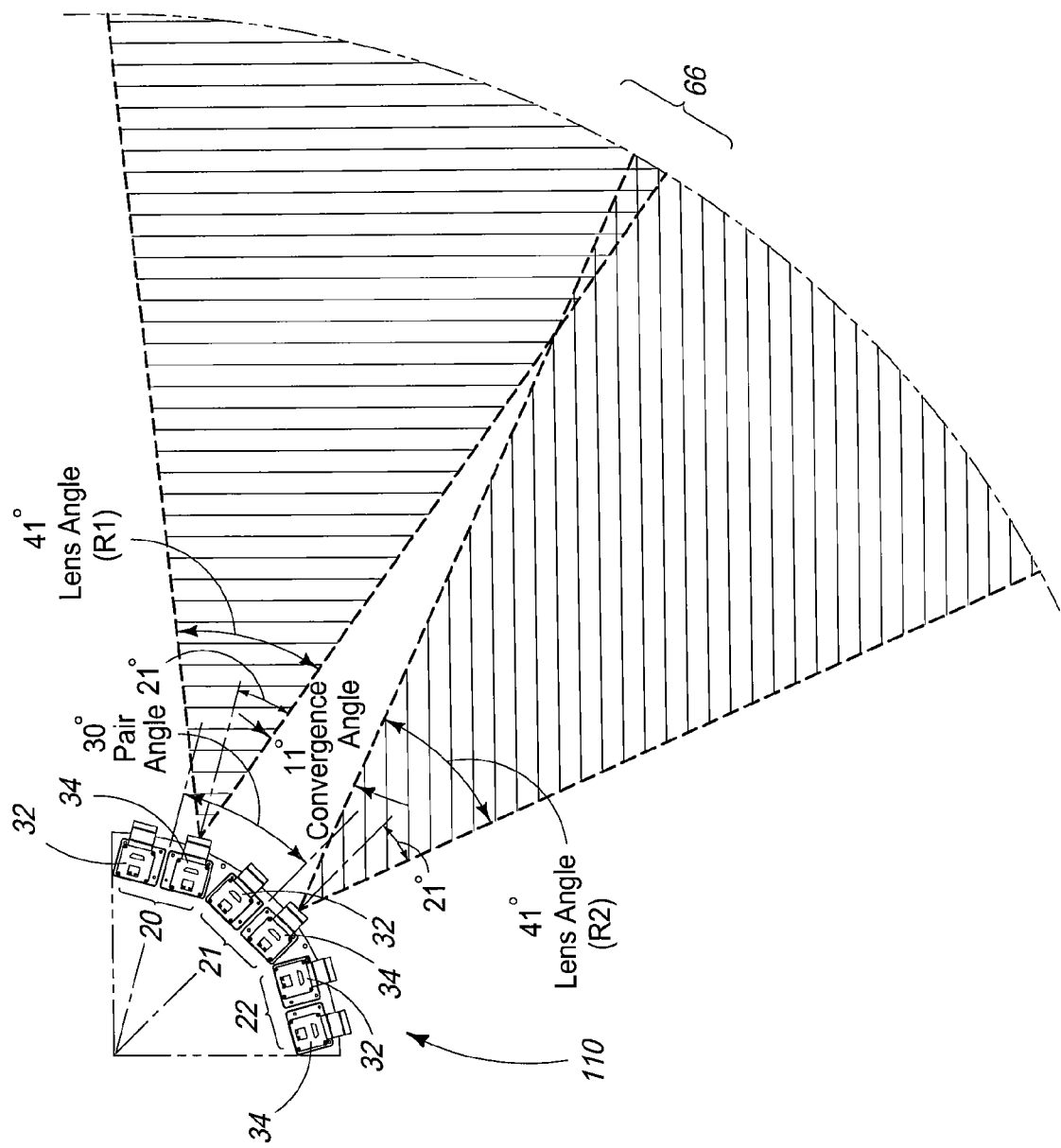
FIG. 12 is simplified plan view corresponding with the view in FIG. 11, but taken further away to illustrate overlapping lens fields of view for the two adjacent right cameras.

FIGS. 11 and 12 illustrate in plan view one exemplary set of adjacent right cameras 34 from adjacent pairs of stereoscopic pairs 20, 21 of cameras 32, 34 on stereoscopic camera system 110. More particularly, simplified representations of fields of view for right camera 34 of pair 20 and right camera 34 of pair 21 are shown. It is understood that a similar representation exists for left cameras 32 in any adjacent pair, as well as for any adjacent right cameras 34.

Figure 13:
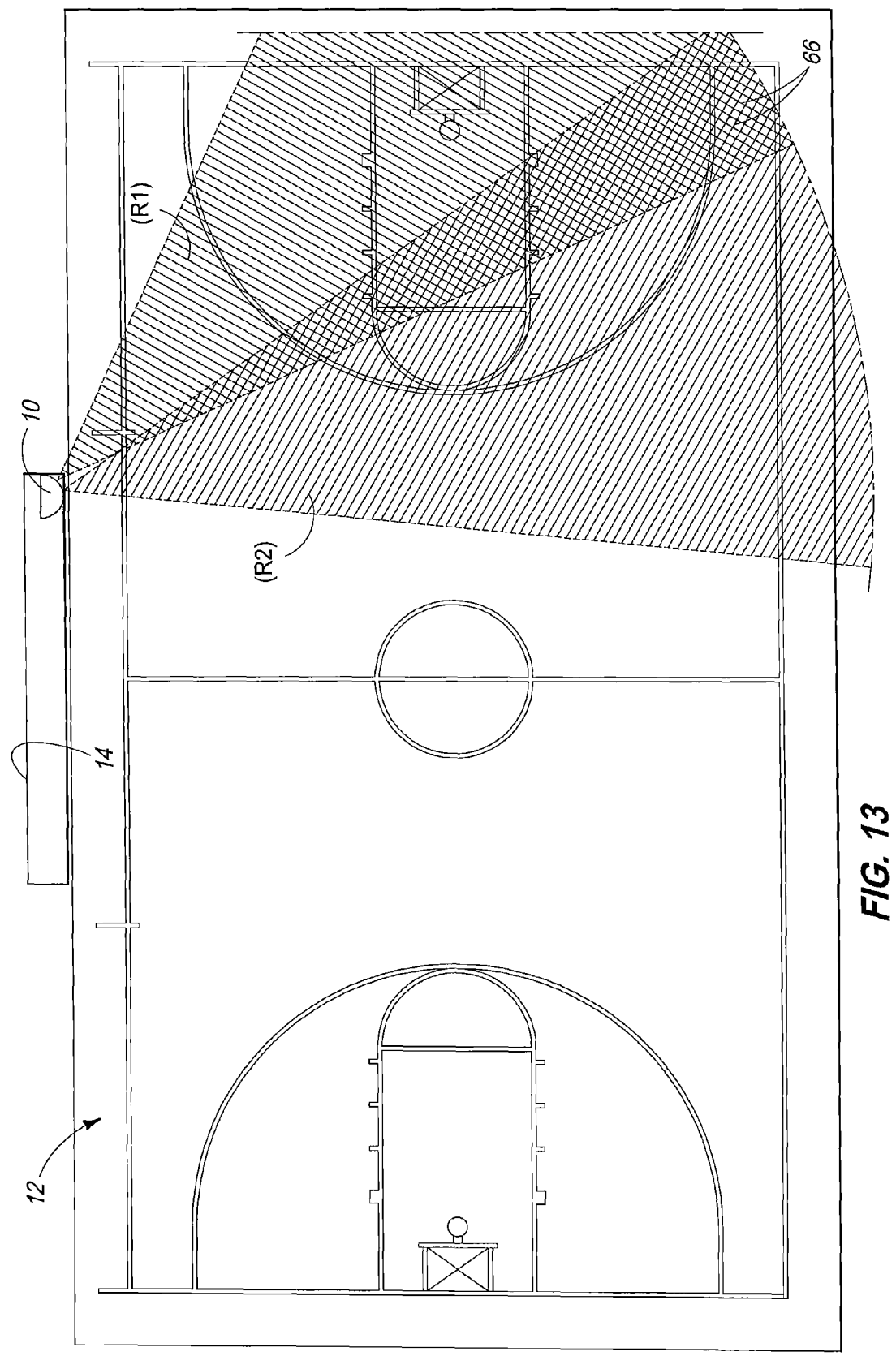
FIG. 13 is a simplified schematic plan view of a basketball court showing overlapping fields of view for two adjacent right cameras for the stereoscopic camera system of FIGS. 1-3.

Each camera 34 has a lens angle. Adjacent cameras 34 have lens angles that form a convergence angle. As shown in this embodiment, there is a 30 degree angle between the central line of sight (view direction) from lenses 64 on adjacent pairs of stereoscopic cameras. FIG. 12 illustrates an overlap region 66 that occurs at a specific distance away from system 110. FIG. 13 further illustrates adjacent overlapping fields of view for right cameras (R1) and (R2), along with overlap region 66 within a basketball court environment. Output from respective cameras is processed using seaming and warping techniques to join together the output of adjacent right cameras and adjacent left cameras in order to produce a field of view that is greater than that provided by a single camera, or a single pair of stereoscopic cameras. However, in order to reduce computer processing, either in real time or after image capture (video or still), cameras 32 and 34 (see FIG. 11) are aligned in order to significantly reduce post-processing in order to achieve alignment of captured images between left and right cameras in a pair, as well as between right cameras in adjacent pairs and left cameras in adjacent pairs. The articulating support structure 56 (of FIG. 7) enables this alignment between cameras prior to capturing images, as will be discussed below in greater detail with reference to FIGS. 14-16.

Figure 14:
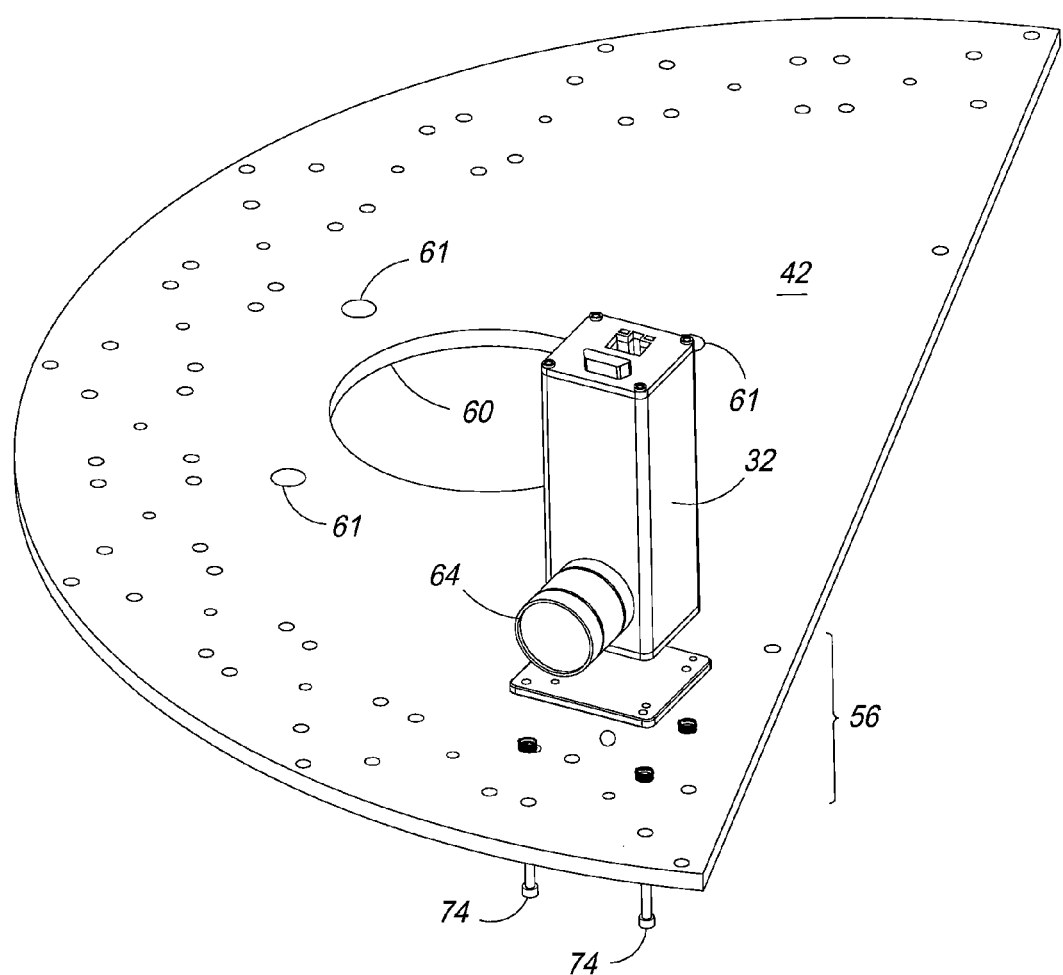
FIG. 14 is an enlarged perspective view of the base plate for the stereoscopic camera system of FIG. 6 (as well as FIGS. 1-3, if flipped upside down) and showing one camera and articulating support structure in exploded view that provides an image capture adjustment mechanism.

FIG. 14 illustrates assembly of a typical camera 32 onto base plate 42 with articulating support structure 56. By adjusting the threaded engagement of individual fasteners 74, camera 32 can be adjusted relative to plate 42 to induce (relative to lens 64) pitch 101 and roll 103 (see FIG. 15). According to an alternative construction depicted in FIG. 17, yaw 102 can also be induced. Furthermore, bearing 70 can be made out of an elastic material, such as a plastic, which can be slightly compressed, enabling vertical adjustment by tightening and loosening all of the fasteners.

Figure 15:
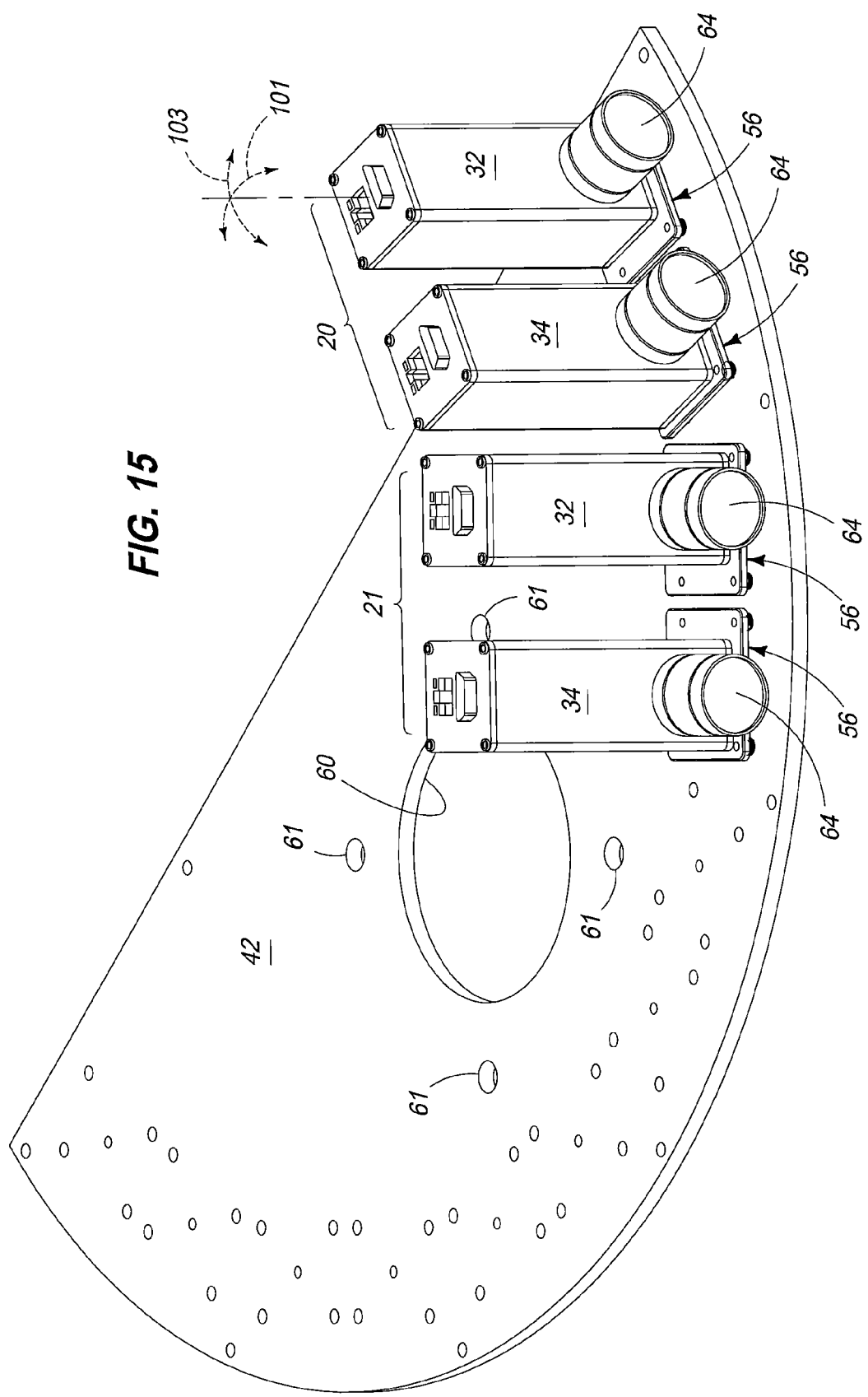
FIG. 15 is another enlarged perspective view of the base plate of FIG. 14 and showing two adjacent pairs of stereoscopic cameras, each mounted to the base plate with a dedicated articulating support structure.

FIG. 15 depicts two adjacent stereoscopic pairs 20 and 21 of left cameras 32 and right cameras 34, each mounted atop a dedicated articulating support structure 56. It is understood that system 10 of FIGS. 1-3 merely supports these pairs in an up-side-down configuration in order to produce a more compact housing when the housing is supported on a table, as the individual lenses are spaced further apart from the table top surface which might otherwise interfere with image capture.

Figure 16:
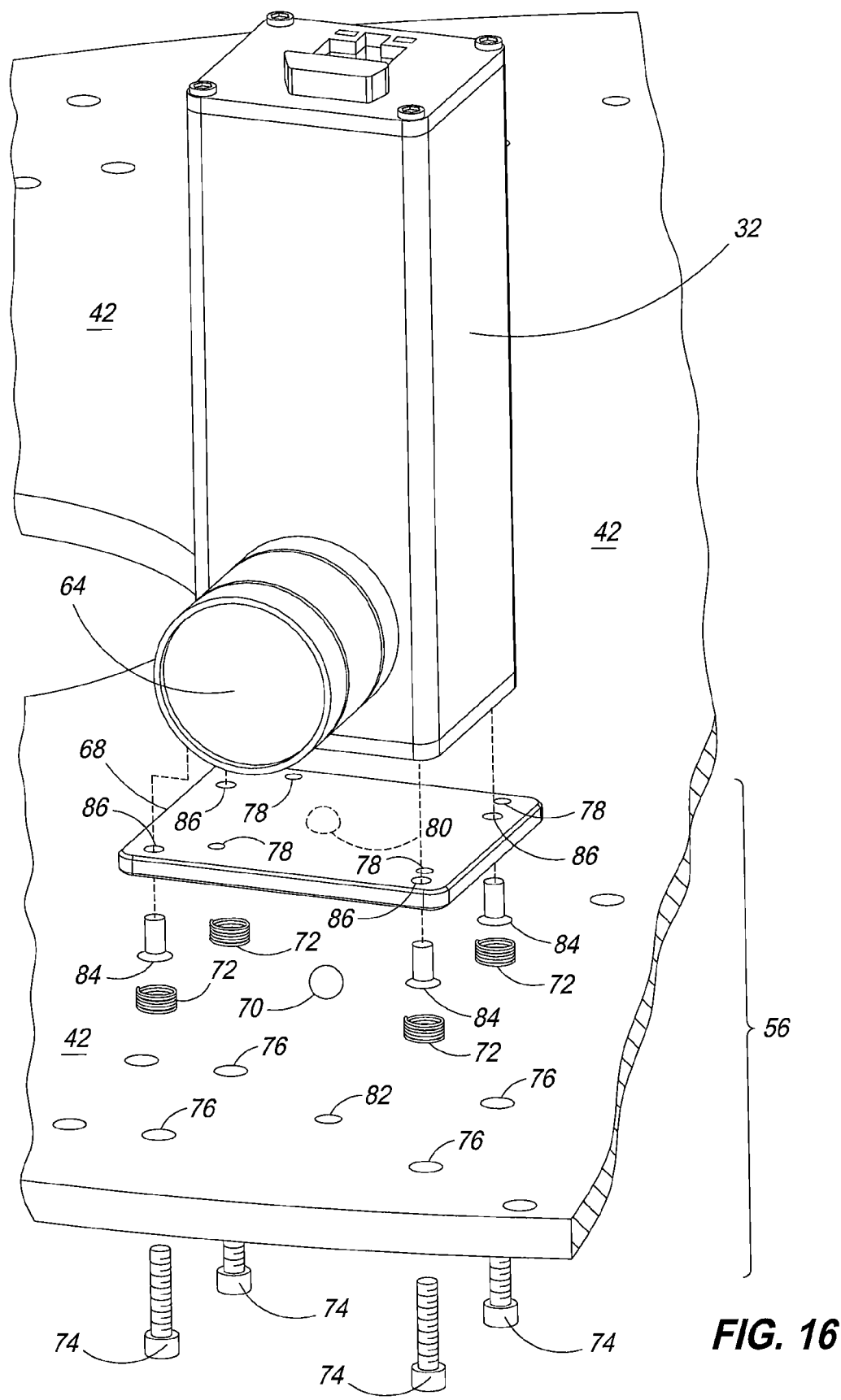
FIG. 16 is a further enlarged breakaway perspective view of the camera, base plate and articulating support structure of FIG. 15.

FIG. 16 illustrates construction of articulating support structure 56. More particularly, structure 56 includes a support plate, or frame 68 that has a semi-spherical seat, or recess 80 on a central bottom surface for receiving a spherical bearing 70 (either plastic or hardened steel). Camera 32 is rigidly secured onto a top surface of plate 68 with threaded fasteners 84 that pass through bores 78 in plate 68 and into threaded bores (not shown) in the bottom of camera 32. Threaded cap screws 74 (with fine threads) pass through bores 76 in base plate 42, through coil steel springs 72, and into threaded bores 86 in plate 68. Ball bearing 70 also seats in another semi-spherical seat 82 in a top surface of plate 42. Bearing 70 is larger in diameter than the combined depths of seats 80 and 82 so that plate 68 is spaced from plate 42 in assembly. By tightening the front pair of fasteners 74 and loosening the rear pair of fasteners, camera 32 can be pitched forward, thereby enabling relative adjustment of the field of view compared to an adjacent camera. Likewise, tightening of a left pair of fasteners 74 and loosening of a right pair of fasteners 74 will cause camera 32 to roll left. It is understood that total compression is still maintained against the bearing 70 after this adjustment is made. In this manner, a horizontal alignment and an angular alignment between adjacent cameras can be performed. By placing a horizontal object in front of an adjacent pair of cameras (two lefts, two rights, or a left and a right), scan lines can be adjusted to be both parallel and in alignment horizontally between adjacent cameras using articulating support structure 56.

Figure 17:
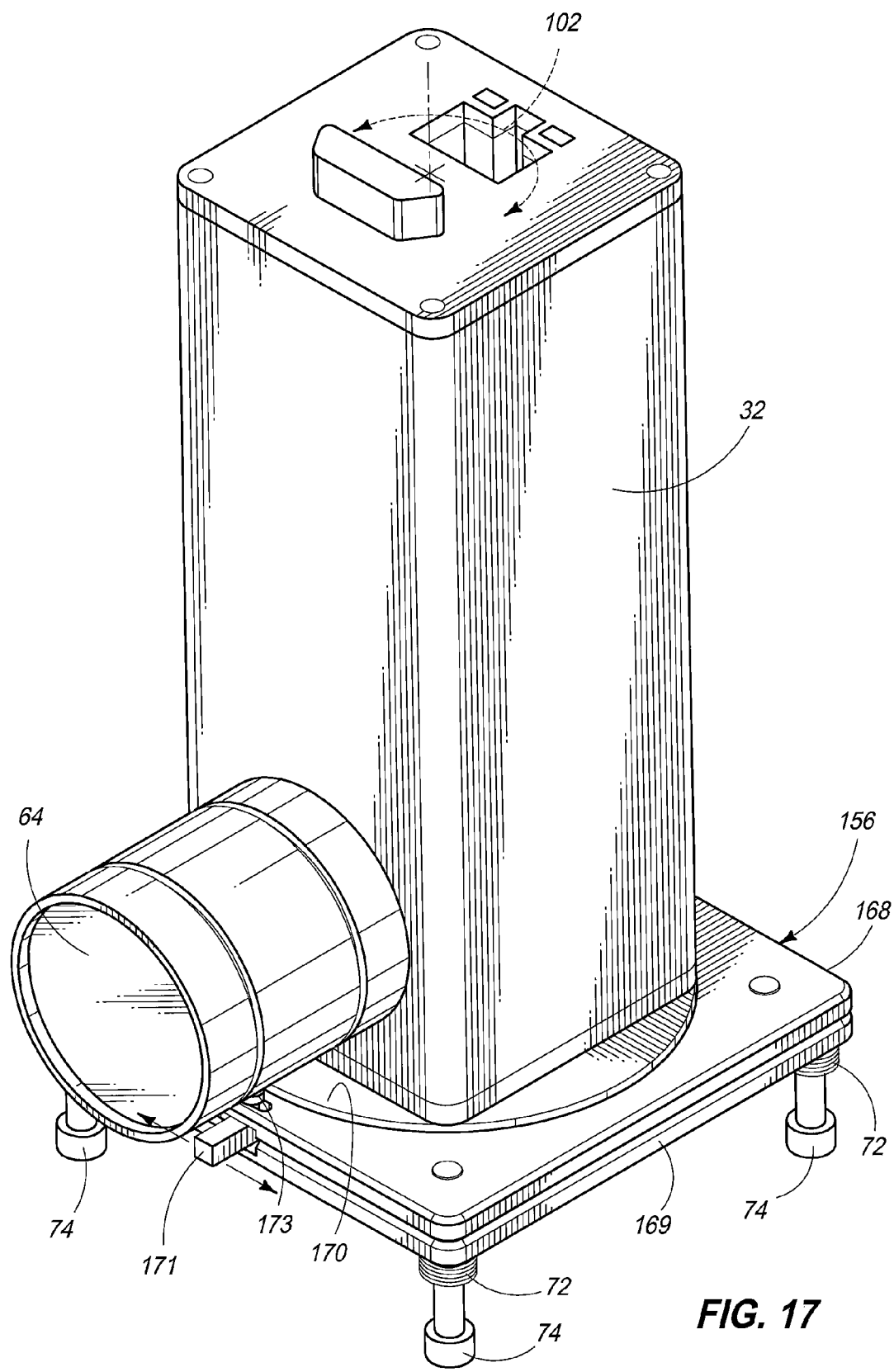
FIG. 17 is another embodiment of an articulating support structure suitable for use with the stereoscopic cameras systems of FIGS. 1-9 and 11-16, providing another embodiment for an image capture adjustment mechanism.

FIG. 17 illustrates another embodiment for an image capture adjustment mechanism, or articulating support structure 156 that further enables adjustment to rotate camera 32 in order to induce yaw 102. More particularly, a turret plate 170 is captured for constrained rotation between an upper plate 168 and a lower plate 169. A radial arm 171 on plate 170 is constrained within a slot 172 to enable rotational adjustment of turret plate 170 relative to plates 168 and 169. As shown in FIG. 17, a set screw 173 is used to fix positioning of turret plate 170 and camera 32 relative to plates 168 and 169.

More particularly, threaded fasteners 84 pass through bores 179 in plate 170 and into complementary threaded bores (not shown) in the bottom of camera 32. Camera 34 is similarly mounted. Threaded recessed head screws 184 pass through bores 182 in plate 169 and into complementary threaded bores 180 in plate 168 to hold together plates 168-170. Threaded fasteners 74 pass through the base plate (not shown), springs 72, and into complementary threaded bores 182. This traps bearing 70 in a manner similar to that shown in FIG. 16 and adjustment of screws 74 enables pitch and roll adjustment of camera 32, while turret 170 enables yaw adjustment.

Figure 19:
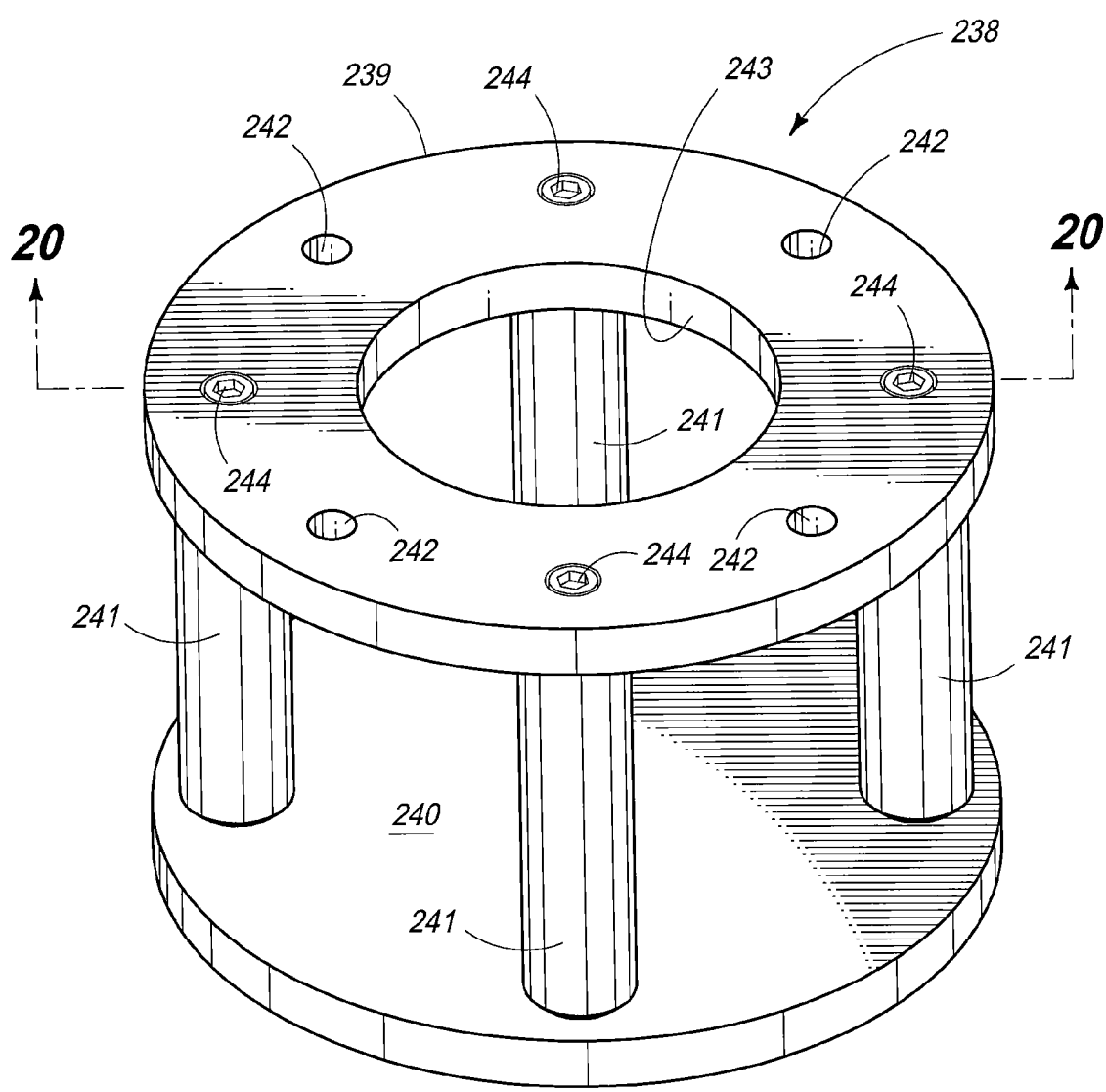
FIG. 19 is a pedestal for mounting the stereoscopic camera systems of FIGS. 4 and 5 atop a post and a tripod, respectively.
Figure 20:
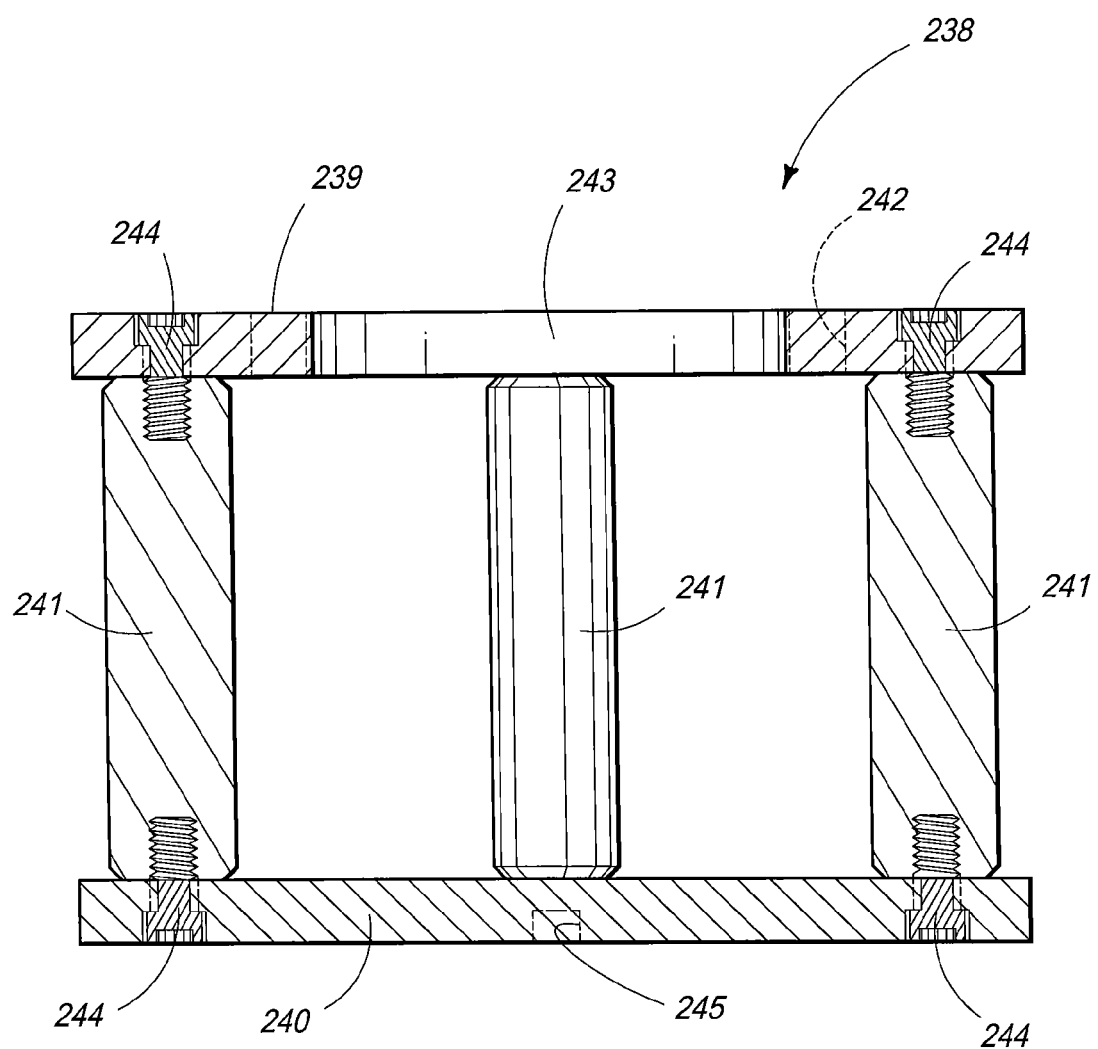
FIG. 20 is vertical sectional view of the pedestal taken along line 20-20 of FIG. 19.

FIG. 19 illustrates construction details of pedestal 238. A top ring 239 and a bottom plate 240 are held together with four posts 241 using threaded fasteners 244. Central bore 243 enables passage of communications and power cables passing to the cameras on the system mounted atop pedestal 239 via fasteners passing through bores 242. As shown in FIG. 20, a threaded recess 245 is used to affix plate 240 atop a post or tripod using a complementary threaded fastener.

According to one construction, cameras 32 and 34 are each an IDS GigE Model Number UI-5649 HE-C, a high-performance GigE camera with large functional range. Image data from an Aptina CMOS sensor in 1.3 Megapixel resolution (1280×1024 pixels) is output with up to 12 bits per channel. An internal FPGA with 64 MB image memory offers additional features and ensures fast and reliable data transfer. Besides a lockable GigE port, the UI-5649 HE-C comes with a multi-I/O-interface including 4 digital in-/outputs and an RS232 interface. An optional camera is the IDS GigE Model Number LB-5640HE. Both cameras are available in the United States at IDS Imaging Development Systems, Inc., 400 West Cummings Park, Suite 3400, Woburn, Mass. 01801. Such cameras capture still or video images, where video images are time displaced still images.

Figure 21:
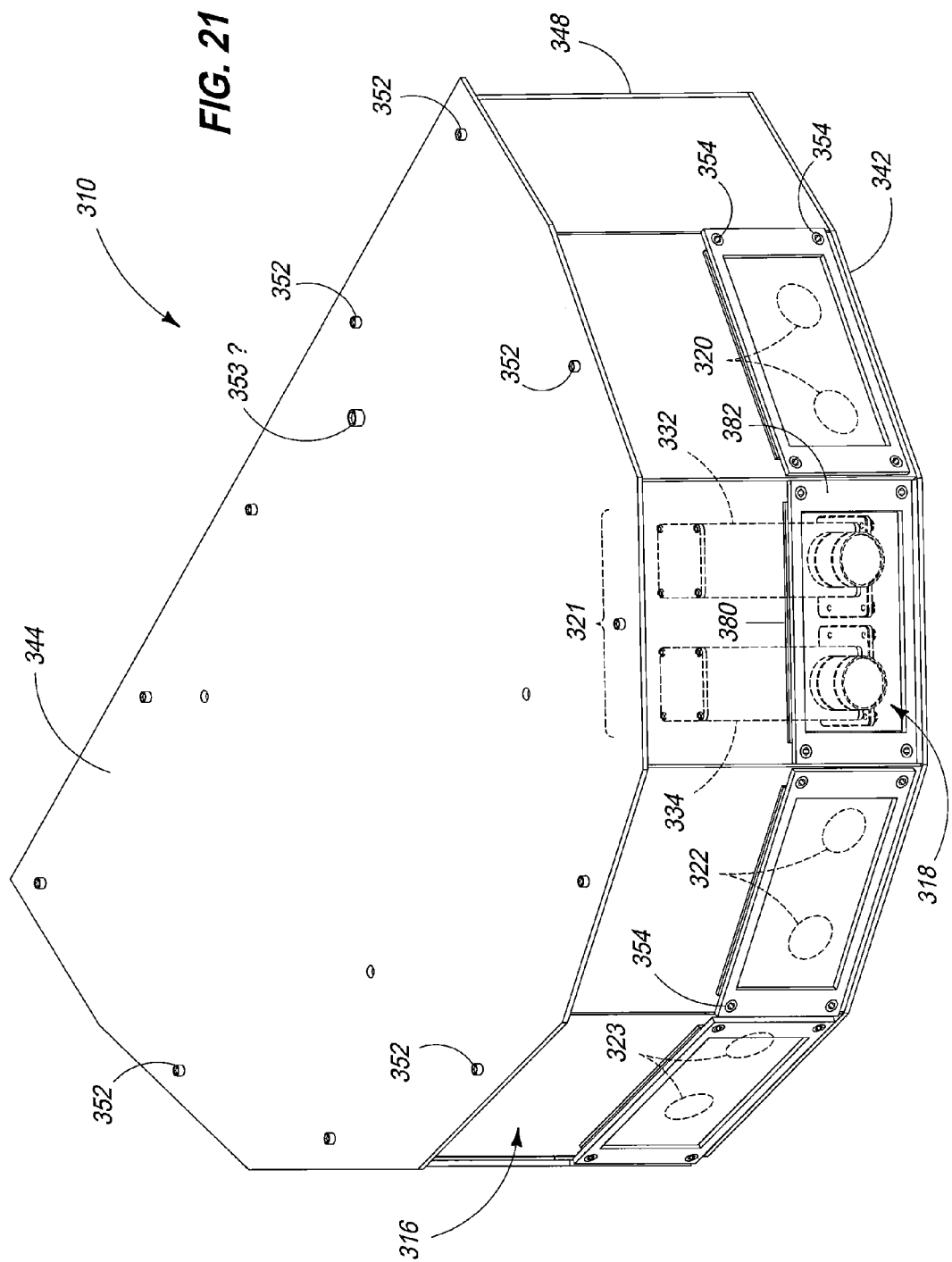
FIG. 21 is a perspective view from above of a fourth stereoscopic camera system, similar to that depicted in FIG. 5, but with a 180 degree stereoscopic camera array using a housing with discrete planar glass windows for each set of left and right stereoscopic cameras.
Figure 22:
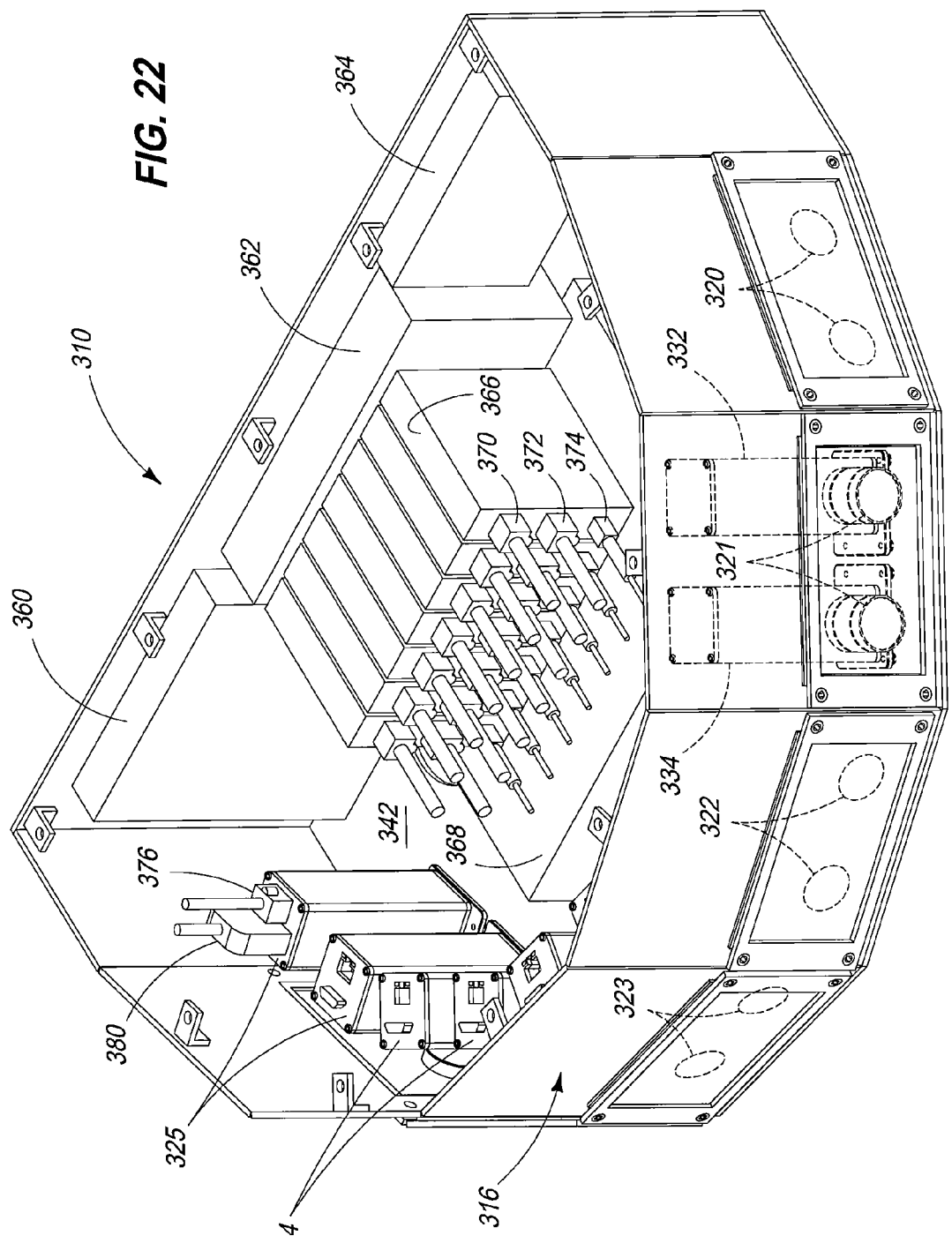
FIG. 22 is an enlarged perspective view of the stereoscopic camera system of FIG. 21 with housing portions removed in order to illustrate camera system components within the housing.
Figure 23:
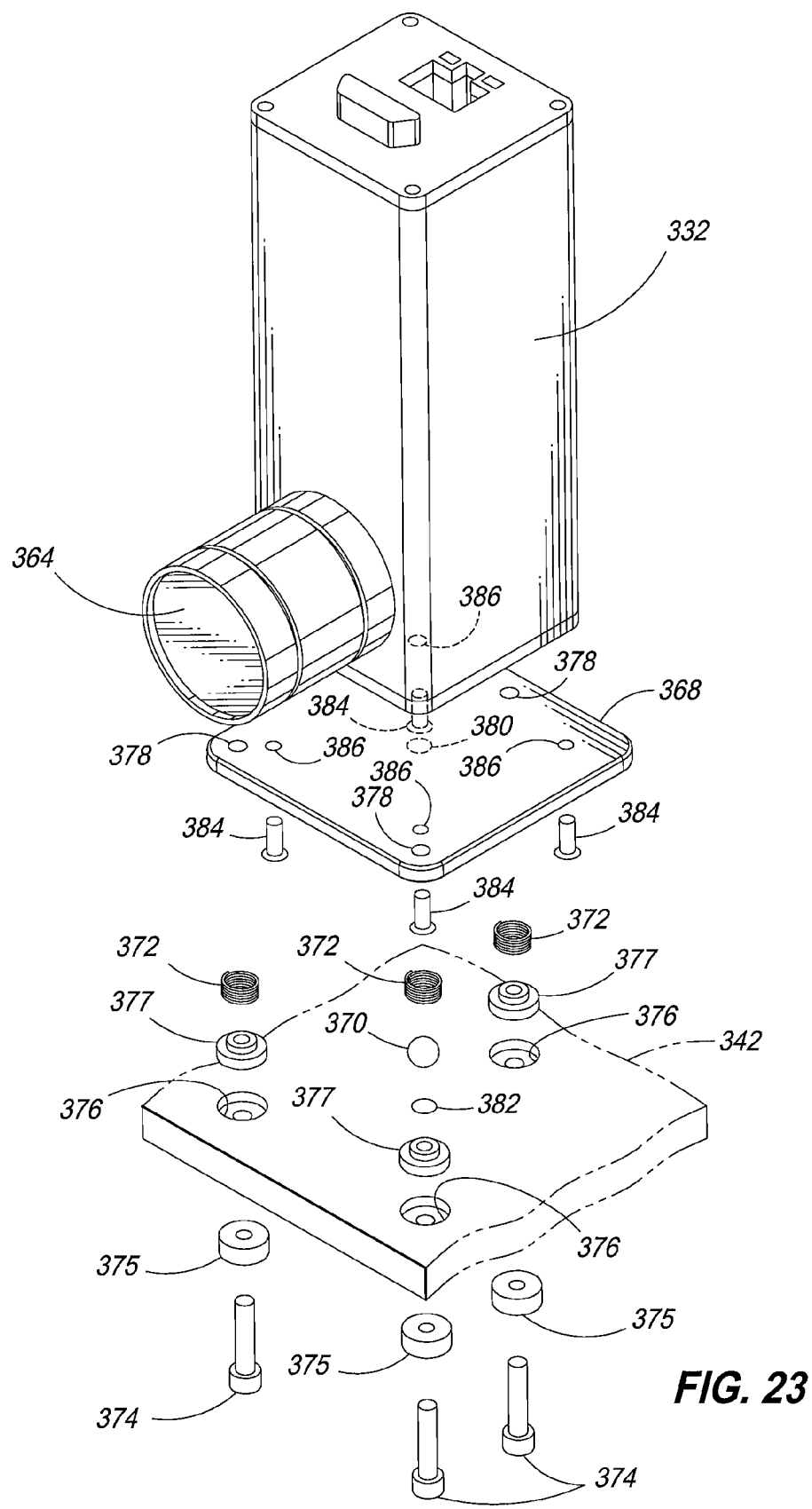
FIG. 23 is a further enlarged breakaway perspective view of the camera, base plate and articulating support structure of FIGS. 21 and 22, providing even another embodiment for an image capture adjustment mechanism.

FIGS. 21-23 illustrate another embodiment for a stereoscopic camera system 310 having a 180 degree array of pairs 320 of stereoscopic left and right cameras 332 and 334 supported within housing 316. Housing 316 mounts via pedestal atop a tripod, or support structure, similar to support structure provided by post 36 and base plate 38 shown in FIG. 5. As shown in FIG. 21, threaded cap screws 352 affix together a top plate 344, a side plate 346, and a bottom plate 342 for housing 316 of camera system 310. Left and right video cameras 332 and 334 form a stereoscopic pair 320, with a lens from each camera extending through a respective aperture 318 in side plate 346. Housing 316 is formed by welding together a plurality of individual vertical face plates and a back plate 348 atop a bottom plate 342. A plurality of apertures, or windows 318 are provided in vertical faces of housing 316 for each pair 320-325 (see FIG. 22) of stereoscopic cameras. An aluminum bezel plate 382 is used to retain a rectangular glass plate 380 over each window 318, preferably with one or more rubber gaskets (not shown) provided between glass 380 and housing 316 and/or bezel 382.

FIG. 22 illustrates internal components mounted atop bottom plate 342 and within housing 316 of camera system 310. More particularly, pairs 320-325 of stereoscopic cameras, such as cameras 332 and 334, are mounted atop plate 342, each with an image capture adjustment mechanism that enables physical alignment between cameras. More particularly, a camera power fuse board 360, a power supply 362, and a sound fuse board 364 are affixed to a back inner surface of housing 316. A fiber cable multiplexer, or fiber switch, 368 is affixed atop bottom plate 342. An array of seven individual Ethernet-fiber media/mode converters 366 are mounted atop multiplexer switch 368. Each converter 366 has respective ports for receiving two RJ45 Ethernet connectors from each pair of cameras and a fiber optic connector for sending a fiber optic output signal to fiber multiplexer, or switch 368 where signals are combined in order to generate a single output signal delivered on a fiber to video and audio production facility. One suitable converter 366 is an IE-Multiway, 10/100/1000 Mbps Ethernet Media/Mode converter, sold by IMC Networks, of 19772 Pauling, Foothills Ranch, Calif. 92610.

As shown in FIG. 22, first camera 332 and second camera 334 are carried by the base 342 for adjustable positioning using an image capture adjustment mechanism. Adjacent left cameras, as well as adjacent right cameras, have at least in part adjacent fields of view. Adjacent first and second right cameras (as well as adjacent first and second left cameras) are axially aligned to render collinear an image segment within a field of view for the second camera relative to an image segment within the field of view for the first camera. Adjacent first and second right cameras (as well as adjacent first and second left cameras) are angularly aligned to render the image segment within the field of view for the second camera angularly aligned relative to the image segment in the field of view for the first camera.

As shown in FIG. 23, each camera 332 is supported atop bottom plate 342 in a manner that enables physical adjustment of camera 332 (and lens 364) so as to align the resulting field of view relative to adjacent and related cameras (see FIG. 22). More particularly, adjacent left and right cameras 332 and 334 within a pair 321 of stereoscopic cameras can be physically adjusted to align respective fields of view, thereby reducing or eliminating any need to perform alignment and/or adjustment using software techniques. In many cases software techniques are not ideally suited for live broadcast, as they require computational power, which can introduce significant time delays. Furthermore, nearest-neighbor left cameras and nearest-neighbor right cameras can also be physically adjusted in order to align respective fields of view.

FIG. 23 illustrates one construction for the image capture adjustment mechanism used in FIG. 22 comprising a camera mounting platform, or plate 368, and an articulating support structure comprising a spherical bearing 70 seated between two semi-spherical seats 380 and 382 in plates 368 and 342, respectively. Threaded cap screws 374 pass through a respective hard plastic bushing 375, aperture 376 in plate 342, hard plastic bushing 377, coil steel spring 372, and into threaded bore 378 in plate 368. Four threaded fasteners 384 pass through bores 386 in plate 368 and into respective threaded bores (not shown) in a bottom plate of each camera 332 in order to rigidly secure camera 332 atop plate 368. Camera 332 and plate 368 can be adjusted in pitch and roll by adjusting threaded position of each screw 374 so as to drop and tilt, respectively, lens 364. Adjacent cameras 332 and 334 are carried by a common support base 342 (see FIG. 22).

According to one construction, bushings 375 and 377 each have an inner bore sized slightly smaller than an outer thread diameter on each screw 375. Screw 374 self-taps into bushing 375 upon threaded insertion. Such construction enables the removal of one machine screw 374 for maintenance or replacement, after which such screw can be reinserted and specific number of turns can be applied to the screw equal to the number needed for removal in order to achieve a close approximation to the original position. Furthermore, such construction has been found to resist or eliminate any tendency for plate 368 to tilt relative to plate 342 in the event load is applied to camera 332, such as during maintenance or shipping. Essentially, threads within bushings 375 and 377 resist or prevent any stroking of machine screws 374 relative to plate 342.

Figure 24:
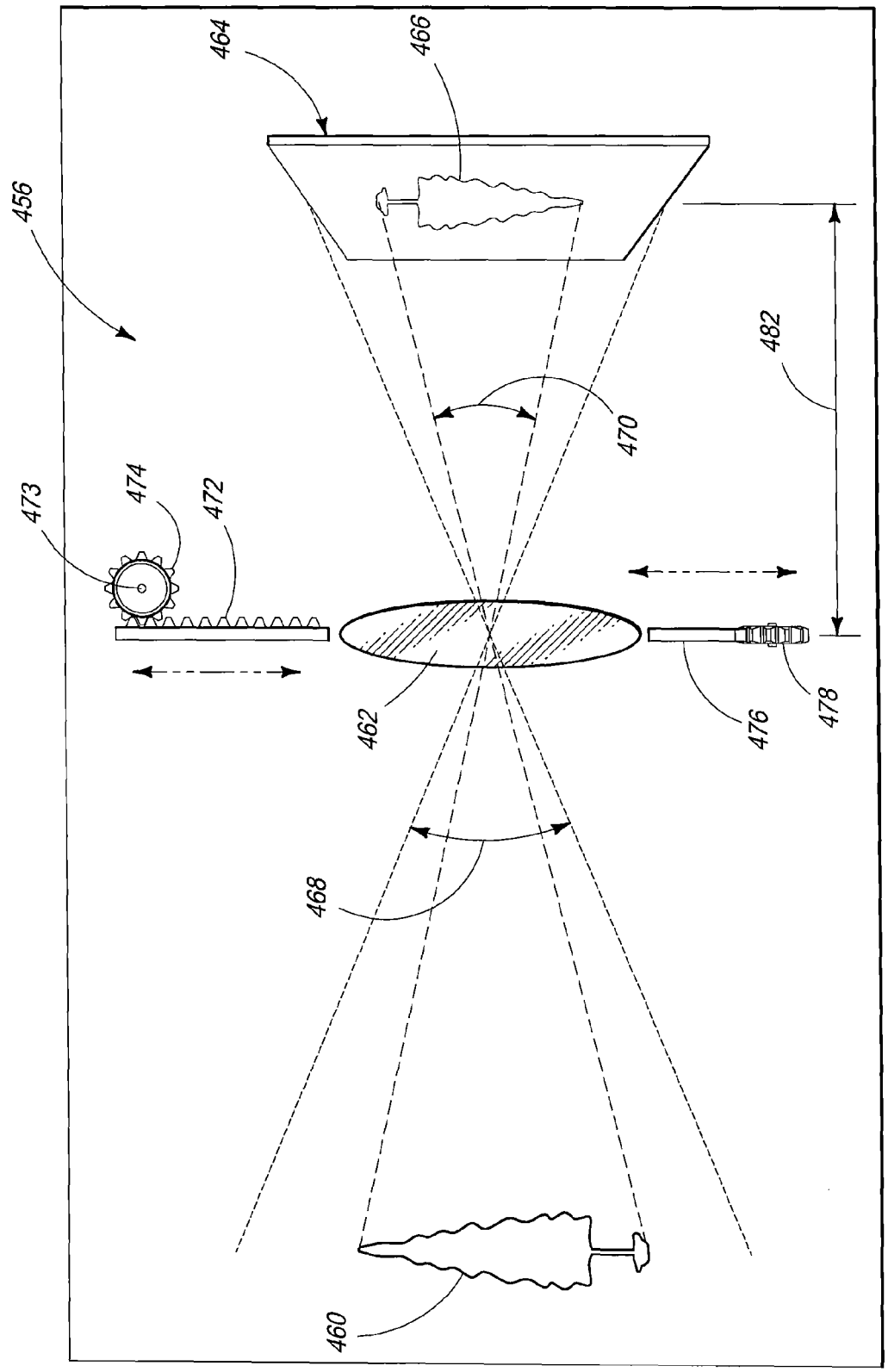
FIG. 24 is a simplified diagrammatic view of even another image capture adjustment mechanism providing a camera lens that is repositionable within a plane perpendicular to the viewing direction.

FIG. 24 is a simplified diagrammatic view illustrating layout of even another image capture adjustment mechanism 456 providing a camera lens 462 that is repositionable within a plane perpendicular to an image viewing direction. More particularly, lens 462 is rigidly supported by a first linear rack 474 and rotary gear 474, and a second linear rack 476 and rotary gear 478. According to such construction, gear 474 is mounted in axially slidable relation on a central shaft 473 in order to accommodate linear motion generated by rack 476 and gear (or pinion) 478. In this manner, an image 466 can be aligned or repositioned relative to an image capture device, or CCD 464. An object 460 is captured within a field of view 468 via lens 462 and is projected with an image range, or region of interest 470 as an image 466 on CCD 464 at a focal length 482. It is understood that lens 462 has peripheral edge portions that are affixed to racks 472 and 476. Optionally, a peripheral edge portion of lens 462 is affixed to a carrier plate, and such plate is rigidly affixed to racks 472 and 476.

Figure 25:
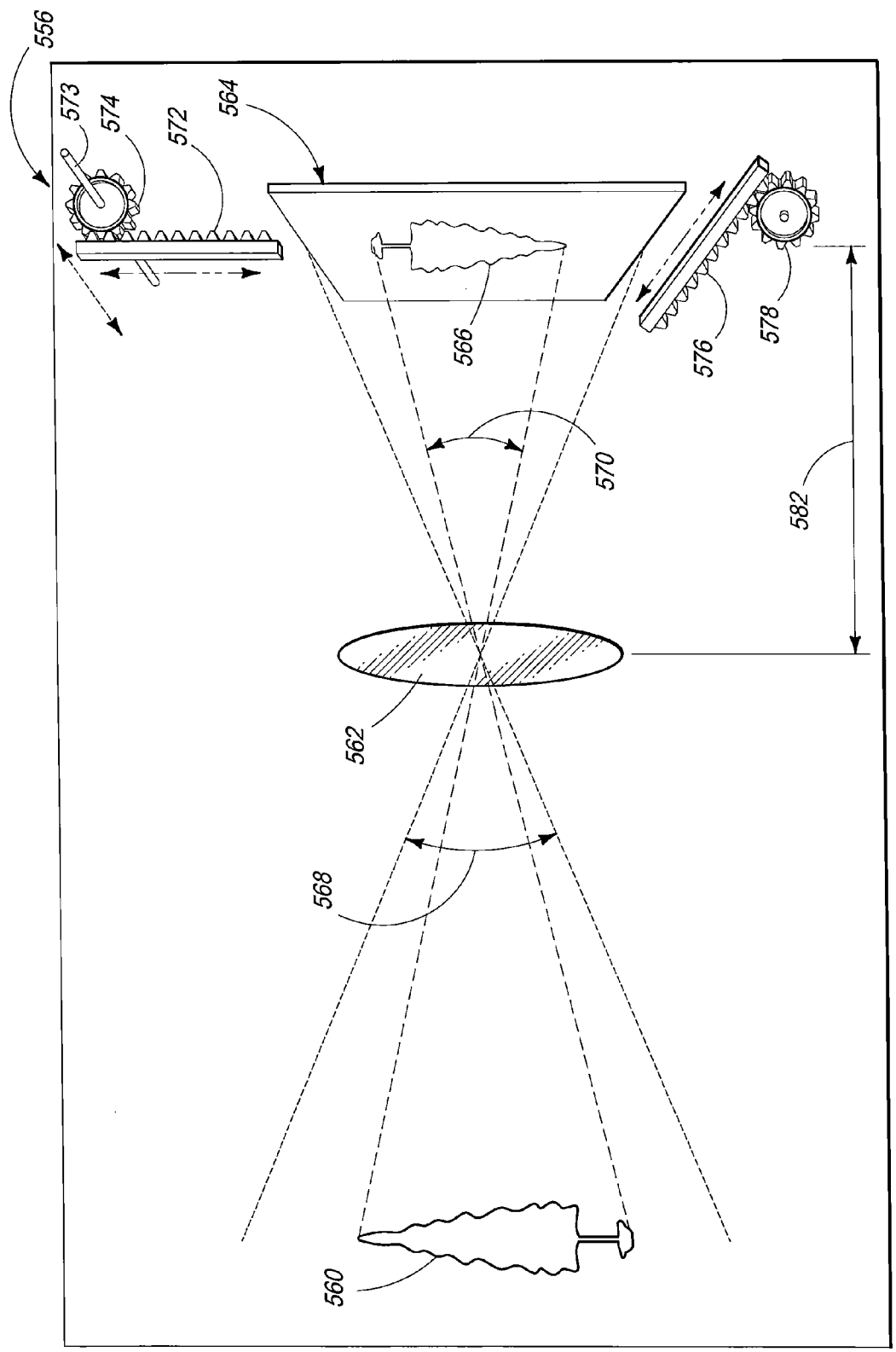
FIG. 25 is a simplified diagrammatic view of yet another image capture adjustment mechanism providing an image capture device (CCD) that is repositionable within a plane of the image capture device.

FIG. 25 is a simplified diagrammatic view illustrating yet even another image capture adjustment mechanism 556 providing an image capture device (CCD) 564 that is repositionable within a plane of the image capture device 564. More particularly, an object 560 is captured within a field of view 568 via a lens 562 and is projected with an image range 570 as an image 566 on CCD 564 at a focal length 582. CCD 564 is rigidly supported by a first linear rack 574 and rotary gear 574, and a second linear rack 576 and rotary gear 578. According to such construction gear, 574 is mounted in axially slidable relation on a central shaft 573 in order to accommodate linear motion generated by rack 576 and gear (or pinion) 578.

Figure 26:
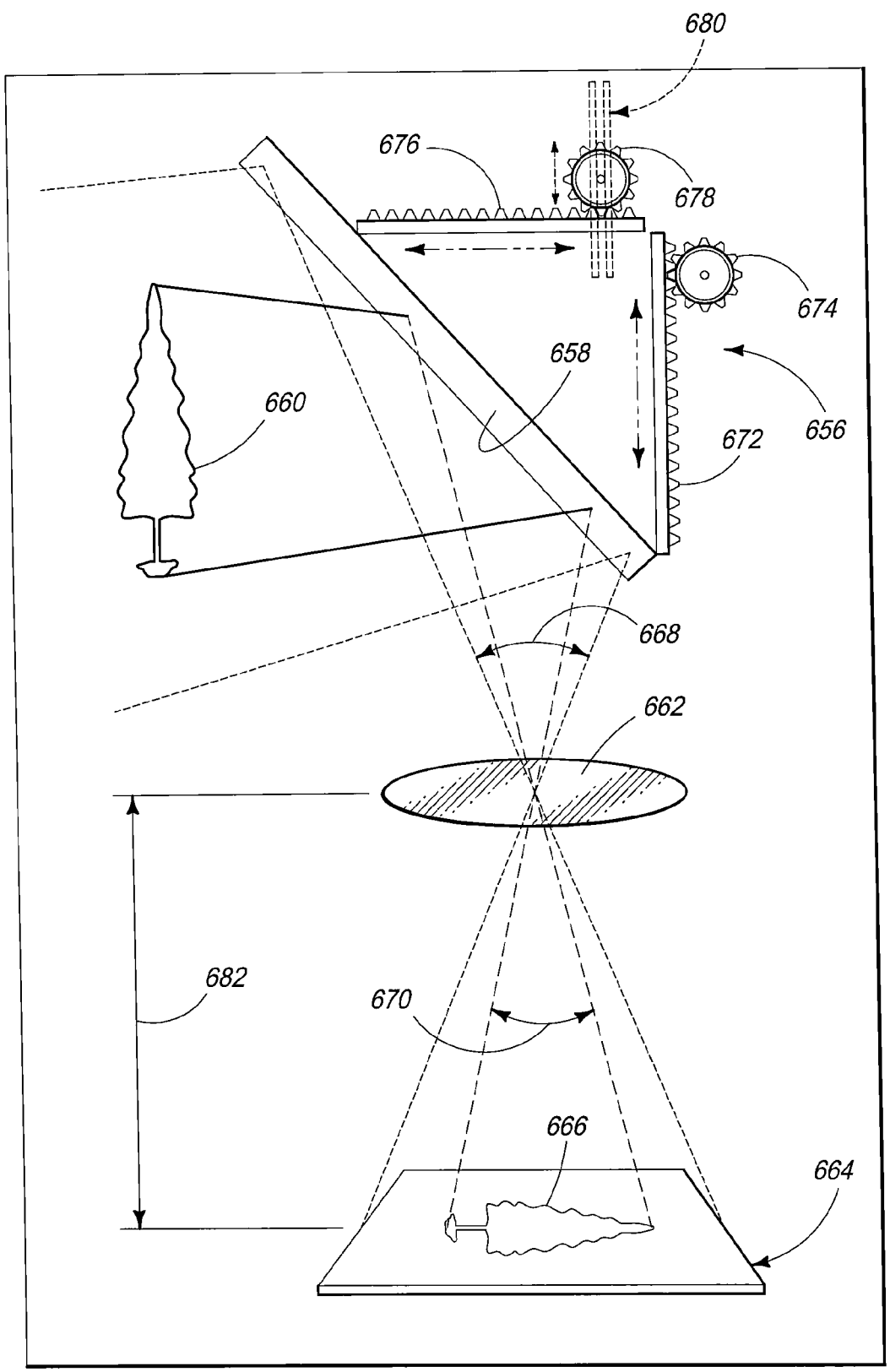
FIG. 26 is a simplified diagrammatic view of yet even another image capture adjustment mechanism providing a repositionable mirror between a camera lens and an image capture device (CCD).

FIG. 26 is a simplified diagrammatic view illustrating yet another image capture adjustment mechanism 656 providing a repositionable mirror 658 between a camera lens 662 and an image capture device (CCD) 664. More particularly, an object 660 is captured within a field of view 668 via lens 662, is reflected by mirror 658, and is projected with an image range 670 as an image 666 on CCD 664 at a focal length 682. Mirror 658 is rigidly supported by a first linear rack 674 and a second linear rack 676. First linear rack 674 interacts with rotary gear 674, and second linear rack 676 interacts with rotary gear 678. According to such construction, gear 678 is mounted in axially slidable relation along a guide slot 680 in order to accommodate linear motion generated by rack 676 and gear (or pinion) 678.

In order to better understand embodiments of the method, detailed examples are presented below for capturing images with respect to FIGS. 27 and 28.

Figure 27:
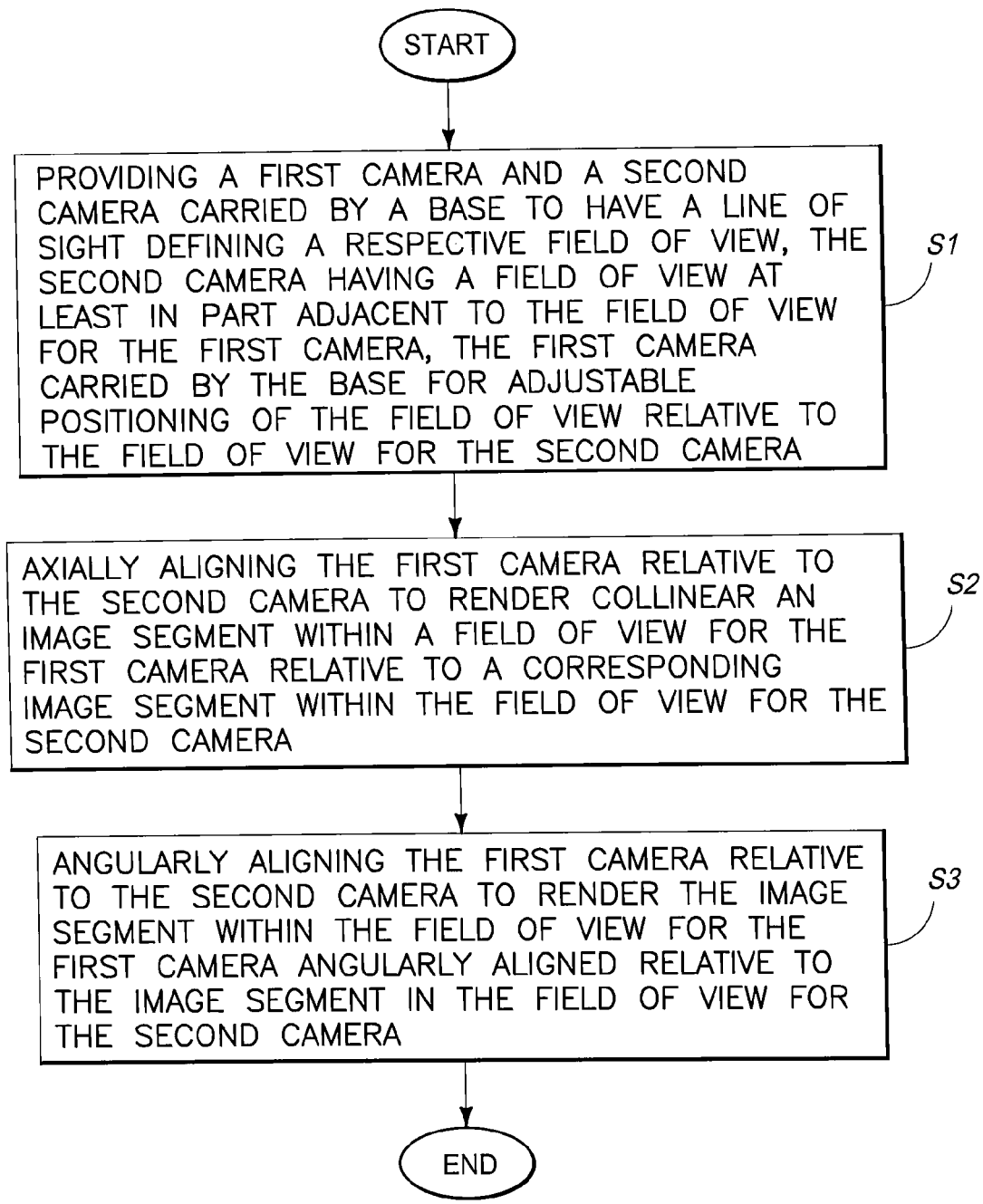
FIG. 27 is a logic flow diagram illustrating one method for physically aligning adjacent image capture devices provided on a support base.

FIG. 27 forms a process flow diagram showing the logic processing for capturing images with one method using the apparatus depicted in FIGS. 1-26. More particularly, FIG. 27 illustrates logic processing used to capture images that are aligned.

As shown in FIG. 27, a logic flow diagram illustrates the steps implemented by any one of the camera systems of FIGS. 1-26 when performing a physical alignment between cameras in the system.

In Step "S1", a camera system (monoscopic or stereoscopic) provides a first camera and a second camera carried by a base to have a line of sight defining a respective field of view. The second camera has a field of view at least in part adjacent to the field of view for the first camera, the first camera carried by the base for adjustable positioning of the field of view relative to the field of view for the second camera. After performing Step "S1", the process proceeds to Step "S2".

In Step "S2", the system axially aligns the first camera relative to the second camera to render collinear an image segment within a field of view for the first camera relative to a corresponding image segment within the field of view for the second camera. After performing Step "S2", the process proceeds to Step "S3".

In Step "S3", the system angularly aligns the first camera relative to the second camera to render the image segment within the field of view for the first camera angularly aligned relative to the image segment in the field of view for the second camera. After performing Step "S3", the process either ends, or proceeds to success adjacent third, fourth, etc. camera for axial aligning and angularly aligning such cameras.

Figure 28:
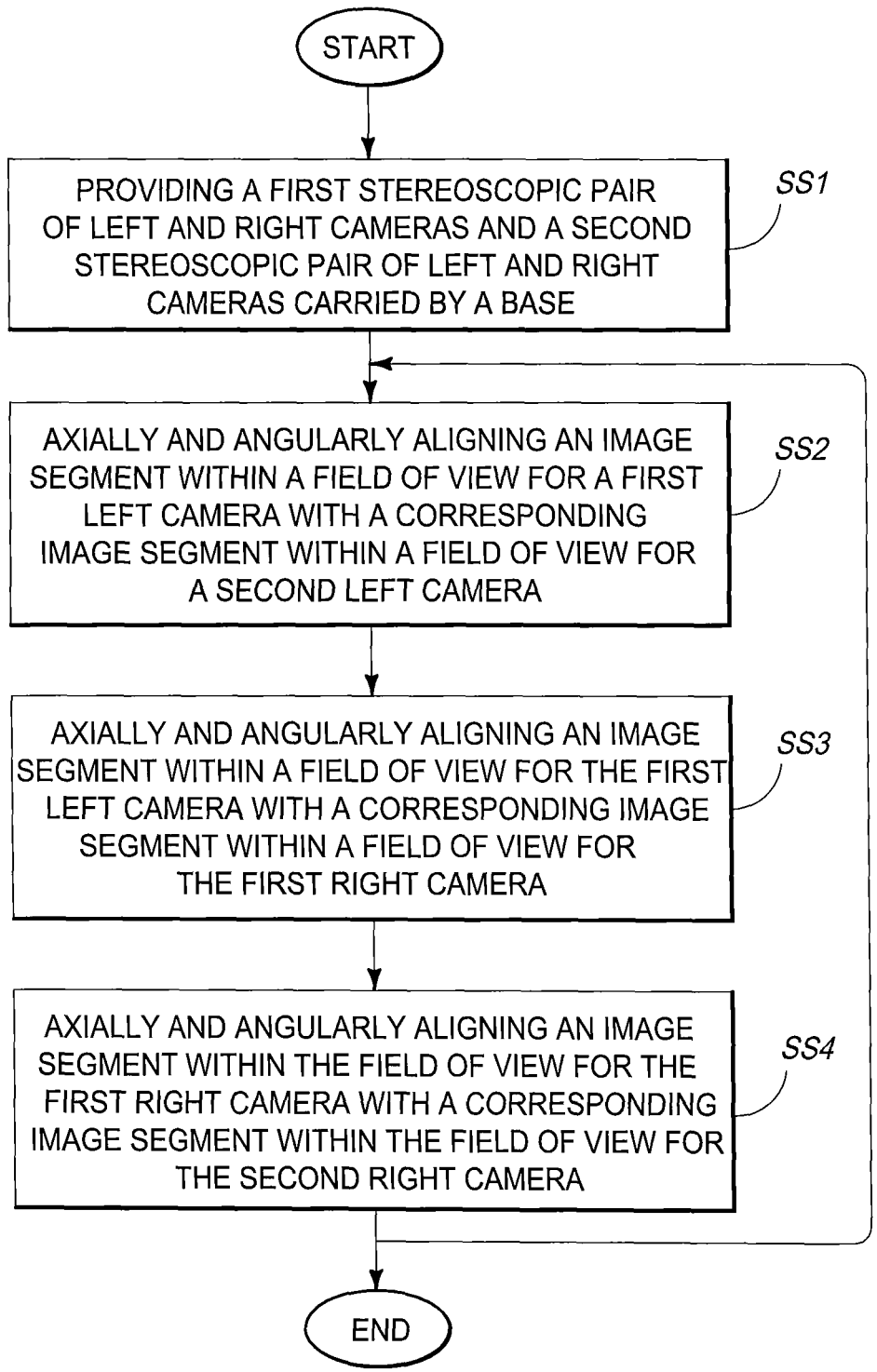
FIG. 28 is a logic flow diagram illustrating another method for physically aligning a plurality of adjacent stereoscopic pairs of left and right cameras provided on a support base.

As shown in FIG. 28, a logic flow diagram illustrates the steps implemented by any one of the camera systems of FIGS. 1-26 when performing a physical alignment between cameras in the system.

In Step "SS1", a stereoscopic camera system provides a first stereoscopic pair of left and right cameras and a second stereoscopic pair of left and right cameras carried by the base. After performing Step "SS1", the process proceeds to Step "SS2".

In Step "SS2", the system axially and angularly aligns an image segment within a field of view for a first left camera with a corresponding image segment within a field of view for a second left camera. After performing Step "SS2", the process proceeds to Step "SS3".

In Step "SS3", the system axially and angularly aligns an image segment within a field of view for the first left camera with a corresponding image segment within a field of view for the first right camera. After performing Step "SS4", the process proceeds to Step "SS4".

In Step "SS4", the system axially and angularly aligns an image segment within the field of view for the first right camera with a corresponding image segment within the field of view for the second right camera. After performing Step "SS4", the process either ends or proceeds back to Step "SS2" and repeats for successive adjacent pairs of stereoscopic cameras.

Following is one procedure for aligning cameras 32 and 34 on the systems depicted above. For purposes of this procedure, camera pairs R1-R6 correspond with pairs 20-25 (see FIG. 7), respectively.

1) Mount each camera to the left and right "Camera Adjustment Plates" by screwing directly into the camera.

2) Mount each Camera Adjustment Plate to the Mounting Plate using screws (tensioned by springs). The plate will sit on top of a bearing for a central rotation point.

3) Power up all the cameras, start capturing the video signals and transferring the video to the display computer. This computer will display the left and right cameras in two panoramic views overlaid (either simultaneously or alternatively in rapid succession) on top of each other in order to evaluate and adjust offsets for stereoscopic viewing.

4) Balance auto white, auto exposure, and colors for each camera and across all cameras.

5) Adjust the focus of each lens until you are satisfied. Set the screws on the lens so that the focus and aperture will not be changed accidentally. Put the lens caps back on the cameras.

6) Uncap Camera R3 (preferably, on a middle or central pair). Using a reference (environmental or something designed) adjust the R3 camera until you are satisfied with the camera level.

7) Uncap Camera L3. Adjust L3 until you are satisfied that L3 and R3 make a viable stereoscopic pair (P3). Test this with the 3D glasses to confirm the quality of the alignment. Adjust either camera as needed.

8) Cap Camera L3 and uncap Camera R2. Adjust camera R2 so that R2 and R3 are approximately aligned.

9) Adjust the cropping on the left edge of the R2 image so that the bottom of the image seam is aligned with R3. Add any warping to R2 necessary to align the upper portion of the image seam. This image should now appear to be seamless if you disregard any color/brightness differences. Alternatively, instead of adjusting cropping only at the bottom and top, the cropping can be adjusted in any of a number of positions from bottom to top in order to obtain the desired quality, limited only by making the adjustment at every single scan line (which is limited by resolution of the charge coupled device).

10) Cap Camera R2 and R3. Uncap Camera L3 and L2. Adjust the cropping on the left edge of the L2 image so that the bottom of the image seam is aligned with L3. Add any warping to L2 necessary to align the upper portion of the image seam for multiple points. This image should now appear to be seamless if you disregard any color/brightness differences.

11) Uncap Camera R2 and R3. Confirm that L2 and R2 make a viable stereoscopic pair (P2). Test this with the 3D glasses (or view it in 3D) in order to confirm the quality of alignment. Adjust cameras as needed confirming seam quality and stereoscopic quality as you go.

12) Repeat Steps 9 and 10 for P1, P4, P5, and P6.

13) Uncap all lenses and access overall quality of stereo and seams. Continue if satisfied.

14) Cap all Left Cameras. Turn off auto white balance and auto exposure. Using a color chart adjust the color and brightness of each right camera so that you have a universal appearance of color and brightness.

15) Choose the right camera which has the most exceptional color and brightness. Cap every other Right Camera.

16) Uncap all Left Cameras. Turn off auto white balance and auto exposure. Adjust the color and brightness of the Left Camera to match the corresponding Right Camera which is still showing.

17) Cap the remaining Right Camera. Using a color chart, adjust the color and brightness of each left camera so that you have a universal appearance of color and brightness.

18) Uncap all the cameras. Confirm that the color and brightness of the cameras is universal. Adjust where necessary.

19) Save configuration.

According to one method, a first right camera and an adjacent second right camera are aligned. A first right camera and a first left camera are also aligned. Furthermore, a first left camera and a second left camera are aligned relative to each other. This process is repeated for successive adjacent cameras until all pairs of cameras within a stereoscopic camera system have been aligned. Alignment occurs by aligning a scan line from a captured image from each adjacent camera both in horizontal alignment and angular alignment, such as by adjusting pitch and roll of one camera relative to the other camera.

The images/frames captured using the camera system described in this invention are processed using several different techniques based on the application and end user needs. In one method, the images are cropped at the two edges and warped along a straight line for fast processing and immediate (real-time or near real-time) consumption by a viewer. In a second method, each scan line (or a group of scan lines) is processed individually using pattern recognition techniques to determine a non-linear scan line merging/warping. This second method may be suitable for parallel processing using multiple computers to reduce processing time. The processed image will appear seamless to the user as the user pans from one camera pair of images to the next.

A viewing system will be provided to the end user for viewing the data captured and processed as described above. The viewing system will allow the user to control the view direction within the total field of view captured by the entire camera set. For example, if the viewer's viewing device (stereoscopic headset, stereoscopic screen—with or without glasses, etc.) provides a field of view or 45 degrees, the user can pan left/right (or any other direction depending on the data captured and processed by the system described above) until the limits of the data set are reached. The user will also be provided with a focus angle control that will allow the user to adjust the view angle between the left and right images by rotating the panoramic left and right images using different angles.

A stereoscopic image processing system is provided having: processing circuitry for retrieving the images and processing the images; memory for storing the images; and an image adjustment mechanism for adjusting the left and right eye image sets independently of each set to minimize the visibility of seams between images taken from different cameras.

A stereoscopic image processing system is provided having: processing circuitry for retrieving the images and processing the images; memory for storing the images; and an image adjustment mechanism for adjusting each left and right eye image pair and combining with the adjustment in the previous paragraph to minimize the visibility of seams between stereoscopic images taken from different cameras.

A stereoscopic image presentation system is provided having: a visual output device configured to output a left stereoscopic image and a right stereoscopic image to a respective left eye and a respective right eye of a viewer; processing circuitry for retrieving the images and presenting the images; memory for storing the images; and a user interface communicating with the processing circuitry and configured to adjust the viewing direction for the viewer by selection of a portion of the processed or unprocessed image data corresponding to the actual field of view of the display system realized by the user.

A stereoscopic camera system is provided including a support structure; a plurality of pairs of stereoscopic cameras comprising a left camera and a right camera; a plurality of camera mounting platforms each supporting at least one of a left camera and a right camera of a specific pair of stereoscopic cameras; and a plurality of articulating support structures each configured to adjustably position a respective camera mount platform relative to the base to axially and angularly align two adjacent left cameras and two adjacent right cameras within adjacent pairs of stereoscopic left and right cameras having adjacent fields of view.

Additionally, in one case each left camera and right camera within a pair of stereoscopic cameras is supported by a unique camera mounting platform and a unique articulating support structure for alignment of the respective camera relative to the support structure.

Furthermore, in one case each articulating support structure enables adjustable positioning of a respective camera mount platform along at least two degrees of freedom.

Additionally, in one case each articulating support structure enables pitch adjustment of a respective camera field of view.

Furthermore, in one case each articulating support structure enables yaw adjustment of a respective camera field of view.

Additionally, in one case each articulating support structure enables roll adjustment of a respective camera field of view.

Furthermore, in one case each articulating support structure enables vertical displacement adjustment of a respective camera field of view.

Additionally, in one case each articulating support structure comprises a pair of plates each with a central socket, a spherical bearing disposed within each socket, with the pair of plates in opposed relation, and a plurality of threaded fasteners extending between the pair of plates to pivotally adjust one plate relative to the other plate about the spherical bearing and sockets.

Furthermore, in one case one plate includes a cylindrical turntable having camera fastener mounts for receiving a camera, the turntable mounted to the one plate and the another plate includes fastener mounts for affixing the another plate to the support structure.

Even furthermore, an apparatus is provided for capturing stereoscopic images including a support structure, a first pair of stereoscopic cameras, and a second pair of stereoscopic cameras. The first pair of stereoscopic cameras includes a first left camera and a first right camera mounted to the base and configured to simulate human depth perception and having a first field of view for the first left camera and the first right camera. The second pair of stereoscopic cameras includes a second left camera and a second right camera mounted to the base and configured to simulate human depth perception and having a second field of view for the second left camera and the second right camera. The first field of view for each of the first left camera and the first right camera extends beyond a range of the second field of view for each of the second left camera and the second right camera.

Furthermore, a stereoscopic image presentation system is provided including a visual output device, processing circuitry, memory, and a user interface. The visual output device is configured to output a left stereoscopic image and a right stereoscopic image to a respective left eye and a respective right eye of a viewer. The processing circuitry is operative for retrieving the images and presenting the images. The memory is operative for storing the images. The user interface communicates with the processing circuitry and is configured to adjust a lateral or rotational offset between the left stereoscopic image and the right stereoscopic image to produce an adjustable stereoscopic convergence angle for the viewer.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. An apparatus for capturing images, comprising:
an array of stereoscopic pairs of video capture devices including a first stereoscopic image capture device positioned to capture a first sequence of stereoscopic images from a first field of view; and
a second stereoscopic image capture device having an image capture alignment mechanism configured to adjust alignment of the second stereoscopic image capture device to capture a second stereoscopic sequence of images from a second field of view at least in part contiguous and aligned at an image segment level with the first field of view so as to align an image segment in the first field of view;
a securing mechanism configured to lock the positioned first image capture device relative to the positioned second image capture device; and
image processing logic to join together the first stereoscopic sequence of images and the second stereoscopic sequence of images with seaming and warping techniques to produce a field of view that is greater than the first field of view and the second field of view.

2. A method for capturing images, comprising:
providing an array of stereoscopic pairs of video capture devices including a first stereoscopic camera to capture a first sequence of images from a first field of view; and
a second stereoscopic camera having an image capture alignment mechanism configured to adjust alignment of a second field of view of a second sequence of images captured by an image capture mechanism of the second stereoscopic camera at least in part contiguous with the first field of view for the first camera to align an image segment in the first field of view in adjoining relation with an image segment in the second field of view;
securing the image capture alignment mechanism of the second camera in fixed positional relation relative to the first camera to retain alignment of the image segment in the first field of view in adjoining relation with the image segment in the second field of view;
joining together the first sequence of images and the second sequence of images with seaming and warping techniques to produce a field of view that is greater than the first field of view and the second field of view.

3. The apparatus of claim 1, further comprising a base configured to support the first stereoscopic image capture device and the second stereoscopic image capture device.

4. The apparatus of claim 1, wherein the first stereoscopic image capture device and the second stereoscopic image capture device each comprise a charge coupled device and the image capture alignment mechanism of the second stereoscopic image capture device is configured to align capture of an image on the charge coupled device.

5. The apparatus of claim 1, wherein the image capture alignment mechanism is configured to adjust position of the second stereoscopic image capture device relative to the first stereoscopic image capture device.

6. The apparatus of claim 1, wherein the image capture alignment mechanism comprises an image capture adjustment mechanism configured to physically adjust positioning of the second stereoscopic image capture device relative to the first stereoscopic image capture device.

7. The apparatus of claim 1, wherein the second stereoscopic image capture device is provided by a camera having a charge coupled device and the image capture alignment mechanism comprises an image capture adjustment mechanism configured to physically adjust a position of the camera relative to the first stereoscopic image capture device.

8. The apparatus of claim 1, wherein the first stereoscopic image capture device is provided by another camera having a charge coupled device and a second image capture adjustment mechanism is provided and configured to physically adjust position of the camera relative to the second image capture device.

9. The apparatus of claim 1, wherein the securing mechanism comprises at least one articulating support surface configured to support the second stereoscopic image capture device and a coupling surface fixable and releasable to enable articulation of the support surface relative to a degree of freedom and fix the support surface about the degree of freedom, respectively.

10. The method of claim 9, wherein the degree of freedom comprises one of translation and rotation.

11. The method of claim 9, wherein the degree of freedom results from one of pitch, yaw and roll of the support surface when released by the coupling surface.

12. The method of claim 2, wherein the image capture alignment mechanism of the second camera comprises an image capture adjustment mechanism, and securing comprises rendering the image capture adjustment mechanism immovable.

13. The method of claim 2, further comprising a securing mechanism associated with the image capture alignment mechanism, and securing comprises fixing position of the securing mechanism after the image capture mechanism of the second camera is aligned.

14. The method of claim 13, further comprising, prior to securing, releasing position of the securing mechanism to enable articulation of the image capture alignment mechanism.

15. The apparatus of claim 1 wherein the seaming and warping techniques include cropping of the first and second stereoscopic sequence of images and warping the first and second stereoscopic sequence of images along a straight line.

16. The apparatus of claim 1 wherein the seaming and warping techniques include processing each scan line or group of scan lines in the first and second stereoscopic sequence of images using pattern recognition techniques to determine a non-linear scan line merging/warping.

17. The method of claim 2 wherein the seaming and warping techniques include cropping of the first and second stereoscopic sequence of images and warping the first and second stereoscopic sequence of images along a straight line.

18. The method of claim 2 wherein the seaming and warping techniques include processing each scan line or group of scan lines in the first and second stereoscopic sequence of images using pattern recognition techniques to determine a non-linear scan line merging/warping.

* * * * *